Aug. 17, 1954

J. E. HORVAT 2,686,638

SPOOLING MACHINE FOR RIBBONS
FOR TYPEWRITERS AND THE LIKE

Filed Aug. 14, 1950

INVENTOR.
Joseph E. Horvat
BY WHITEHEAD & VOGL
PER
ATTORNEYS

Aug. 17, 1954

J. E. HORVAT
SPOOLING MACHINE FOR RIBBONS
FOR TYPEWRITERS AND THE LIKE 2,686,638

Filed Aug. 14, 1950

INVENTOR.
Joseph E. Horvat
BY WHITEHEAD & VOGL
PER *Earle Whitehead*

ATTORNEYS

Aug. 17, 1954

J. E. HORVAT
SPOOLING MACHINE FOR RIBBONS
FOR TYPEWRITERS AND THE LIKE 2,686,638

Filed Aug. 14, 1950

INVENTOR.
Joseph E. Horvat
BY WHITEHEAD & VOGL
PER *Earle Whitehead*

ATTORNEYS

Sheet 3

Aug. 17, 1954

J. E. HORVAT 2,686,638

SPOOLING MACHINE FOR RIBBONS
FOR TYPEWRITERS AND THE LIKE

Filed Aug. 14, 1950

INVENTOR.
Joseph E. Horvat
BY WHITEHEAD & VOGL
PER *Carle Whitehead*

ATTORNEYS

INVENTOR.
Joseph E. Horvat
BY WHITEHEAD & VOGL
PER Earle Whitehead
ATTORNEYS

Aug. 17, 1954
J. E. HORVAT
SPOOLING MACHINE FOR RIBBONS
FOR TYPEWRITERS AND THE LIKE
2,686,638
Filed Aug. 14, 1950
11 Sheets-Sheet 6
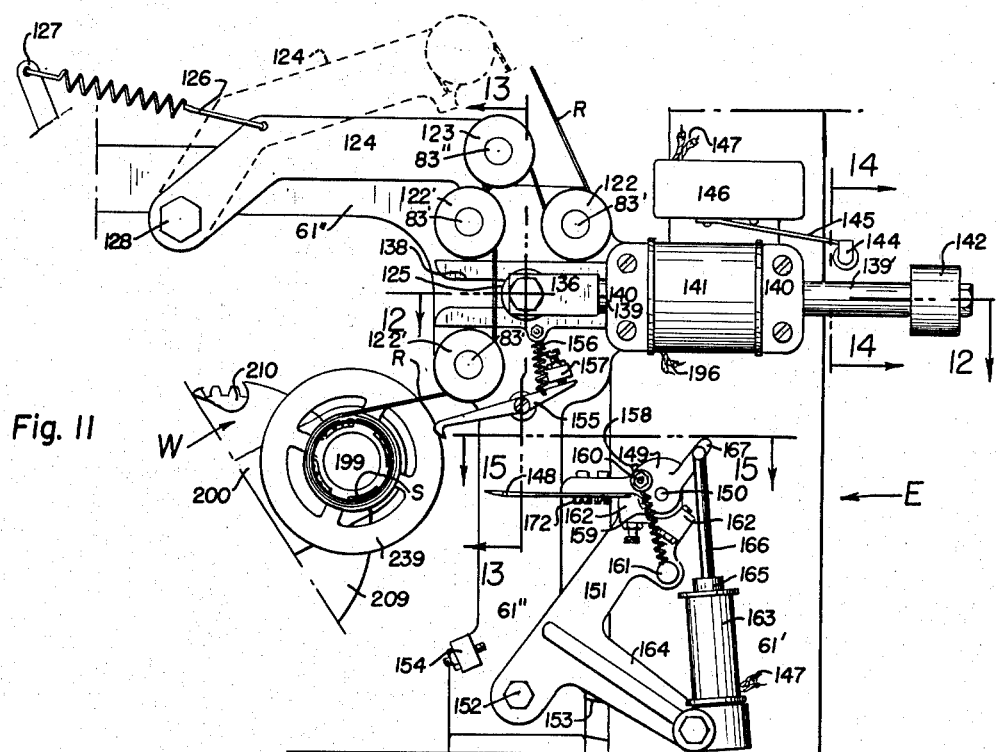
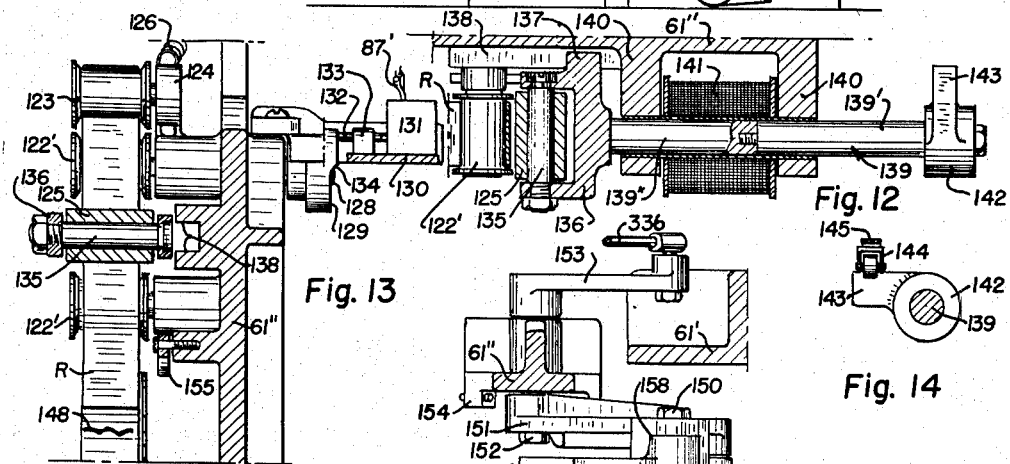
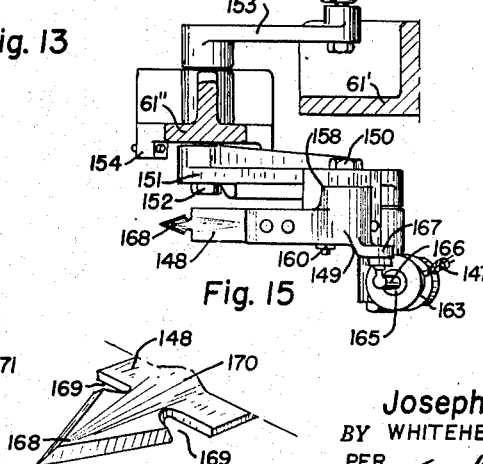
INVENTOR.
Joseph E. Horvat
BY WHITEHEAD & VOGL
PER Carl Whitehead
ATTORNEYS Aug. 17, 1954
J. E. HORVAT
2,686,638
SPOOLING MACHINE FOR RIBBONS
FOR TYPEWRITERS AND THE LIKE
Filed Aug. 14, 1950
11 Sheets-Sheet 7
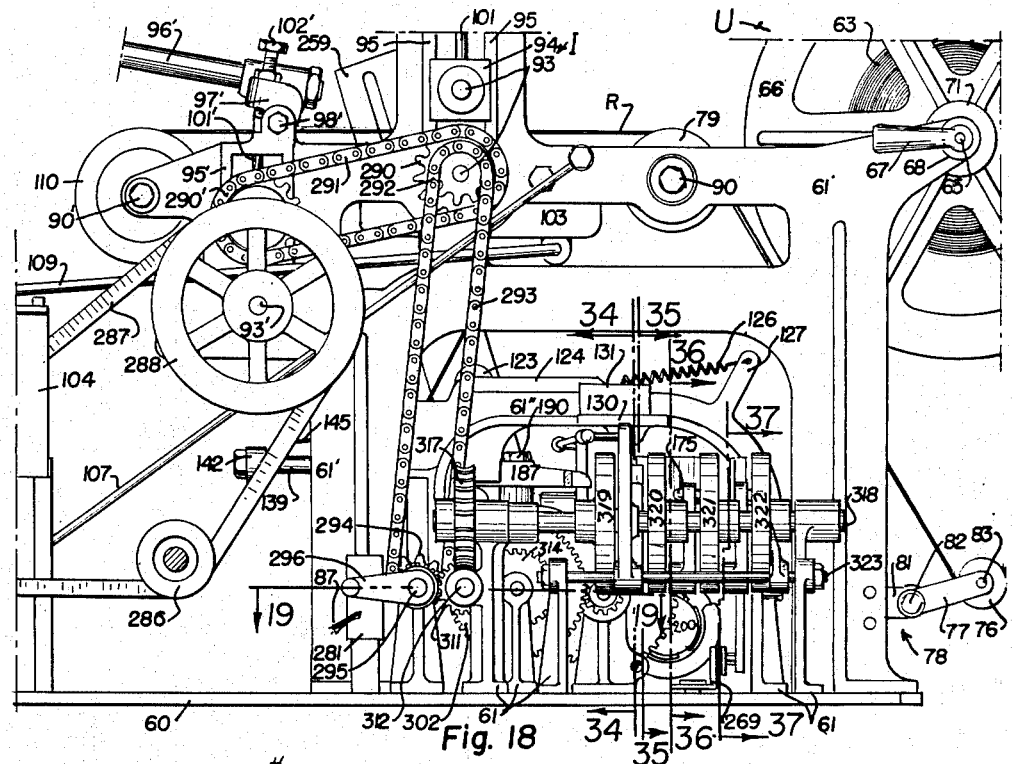
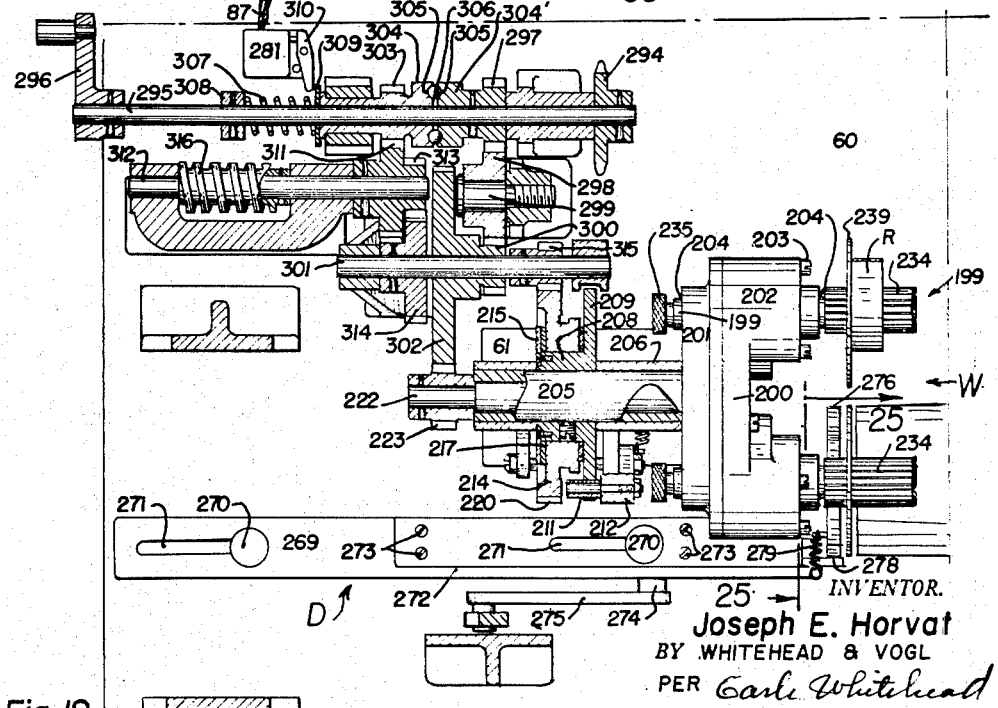
Fig. 19
Sheet 7
INVENTOR.
Joseph E. Horvat
BY WHITEHEAD & VOGL
PER Earle Whitehead
ATTORNEYS

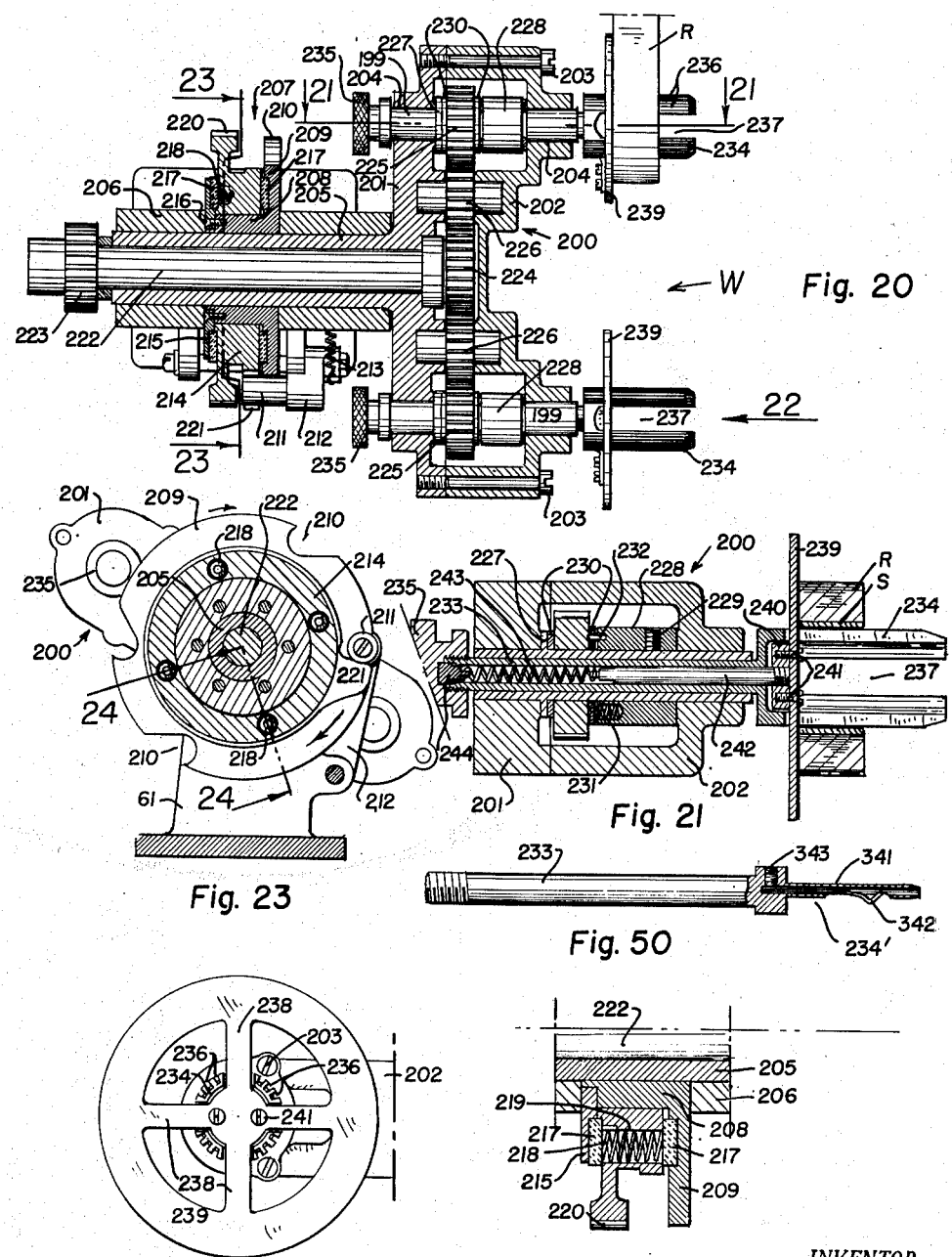

Aug. 17, 1954
J. E. HORVAT
SPOOLING MACHINE FOR RIBBONS
FOR TYPEWRITERS AND THE LIKE
2,686,638
Filed Aug. 14, 1950
11 Sheets-Sheet 9
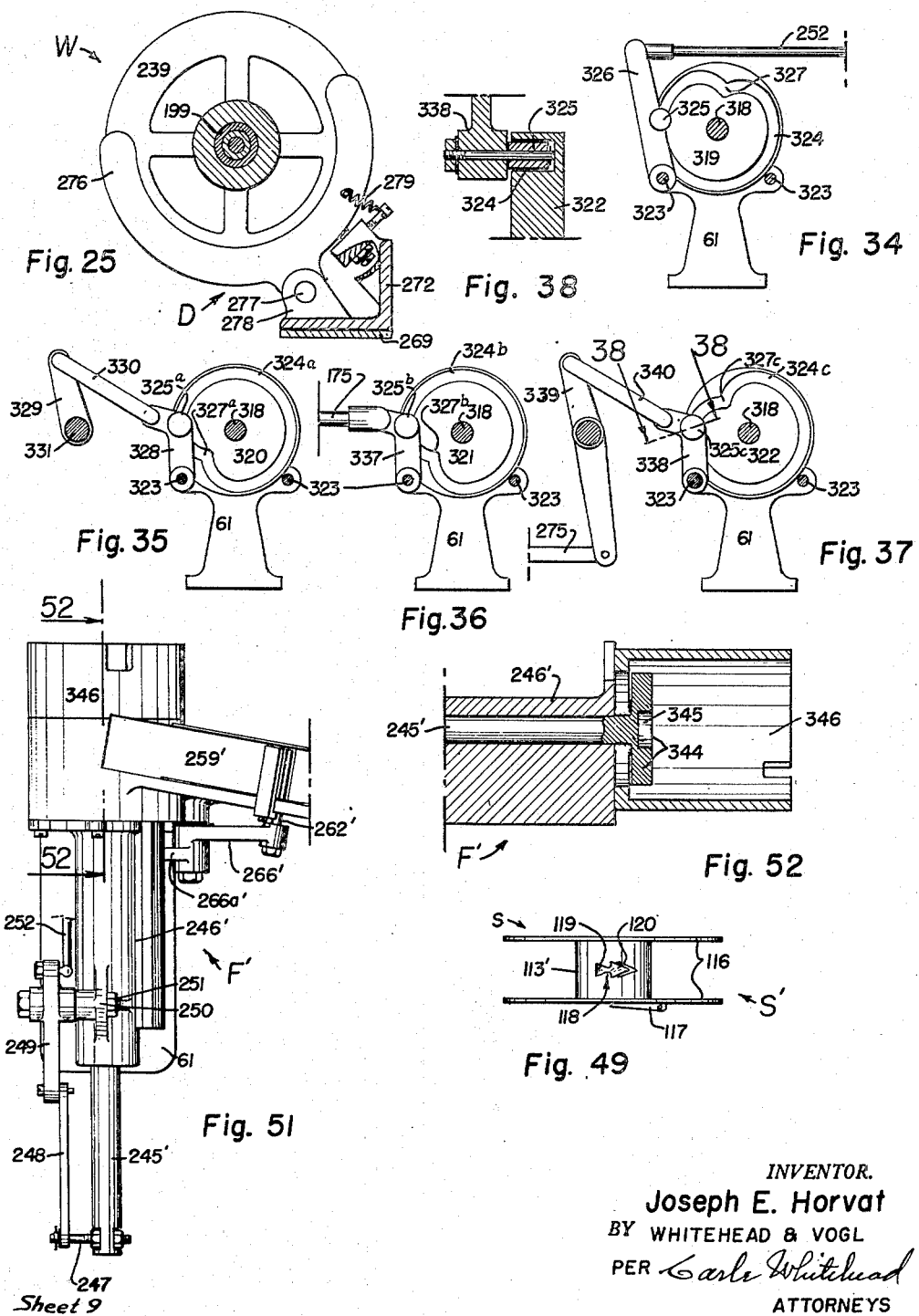
INVENTOR.
Joseph E. Horvat
BY WHITEHEAD & VOGL
PER Carle Whitehead
ATTORNEYS

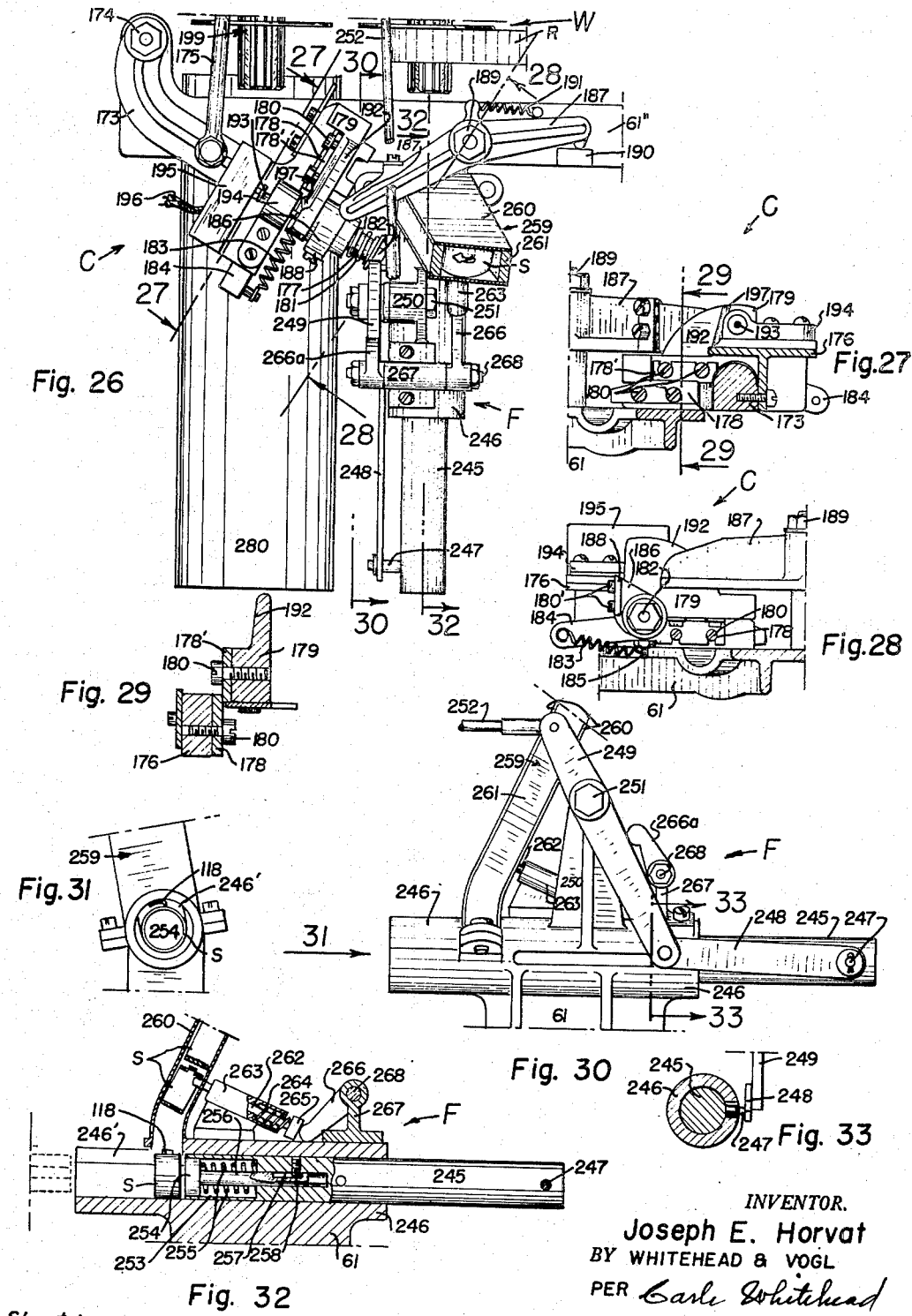

Aug. 17, 1954

J. E. HORVAT 2,686,638

SPOOLING MACHINE FOR RIBBONS
FOR TYPEWRITERS AND THE LIKE

Filed Aug. 14, 1950

INVENTOR.
Joseph E. Horvat
BY WHITEHEAD & VOGL
PER *Carls Whitehead*
ATTORNEYS

Patented Aug. 17, 1954

2,686,638

UNITED STATES PATENT OFFICE 2,686,638

SPOOLING MACHINE FOR RIBBONS FOR TYPEWRITERS AND THE LIKE

Joseph E. Horvat, Denver, Colo.

Application August 14, 1950, Serial No. 179,138

16 Claims. (Cl. 242—56)

This invention relates to ribbon winding machines, and more particularly to such machines which are adapted for winding ribbon upon spools, such as conventional typewriter spools, and has as an object to provide a machine which will automatically wind ribbon from a supply reel onto a conventional typewriter ribbon spool.

Another object of this invention is to provide a machine which will automatically wind ribbon from a supply reel onto a spool such as a typewriter ribbon spool, and which is further adapted to ink the ribbon as it is wound upon the spool.

Another object of this invention is to provide a machine which will automatically wind a measured length of ribbon from a supply reel onto a conventional typewriter ribbon spool, and then automatically cut the ribbon and discharge the full spool from the machine.

Another object of this invention is to provide a ribbon winding machine which will receive a conventional typewriter ribbon spool and will automatically engage the end of a ribbon from a supply reel onto the spool as an incident of winding the ribbon upon the spool.

Another object of this invention is to provide an automatic ribbon winding machine which will sequentially receive conventional typewriter ribbon spools and wind ribbon from a supply reel onto said spools to thereby provide a continuous operation.

Another object of this invention is to provide apparatus in an automatic ribbon winding machine which is adapted to contain a plurality of conventional typewriter ribbon spools, and which is further adapted to align and feed said spools individually and sequentially into the ribbon winding machine to thereby provide spools for a continuous ribbon winding operation.

Another object of this invention is to provide apparatus in an automatic ribbon winding machine adapted to sequentially feed typewriter ribbon spools into the machine which is further adapted to accommodate various types of conventional typewriter spools now common to the trade.

Another object of this invention is to provide, in a continuous automatic ribbon winding machine, means adapted to discharge fully wound typewriter ribbon spools from the machine in regular order suitable for easy handling and packaging.

Another object of this invention is to provide in an automatic ribbon winding machine, a control system which is responsive to the ribbon movements, whereby the machine will stop operation whenever any element fails to operate properly, or whenever the ribbon or spool supply is depleted.

Yet another object of this invention is to provide a new and improved ribbon winding machine adapted for inking and winding ribbon upon conventional typewriter spools, which is fully automatic and continuous in operation, rapid in action, positive in all movements, adapted for easy maintenance, sturdy and rugged in construction, and operable over an extremely long production life.

With these and other objects in view, all of which more fully hereinafter appear, my invention comprises certain novel constructions, combinations and arrangements of elements and parts, as hereinafter described and as defined in the appended claims, and illustrated, in preferred embodiment, in the accompanying drawings in which:

Figure 11 (Sheet 6) is a fragmentary detail of a portion of the elements illustrated at Fig. 4, but on an enlarged scale, and taken substantially on the indicated line 11—11 at Fig. 1 so most of the elements do not appear in section. The broken lines therein indicate alternate positions of the elements so depicted.

Figure 12 (Sheet 6) is a fragmentary section as taken on the indicated line 12—12 at Fig. 11.

Figure 13 (Sheet 6) is a fragmentary section as taken on the indicated line 13—13 at Fig. 11.

Figure 14 (Sheet 6) is a fragmentary section as taken on the indicated line 14—14 at Fig. 11.

Figure 15 (Sheet 6) is a fragmentary section and plan of elements as taken and viewed on the indicated line 15—15 at Fig. 11.

Figure 16 (Sheet 6) is an enlarged view of a ribbon pick-up needle which is illustrated in position with other elements at Figs. 11, 13, and 15.

Figure 17 (Sheet 6) is a further enlarged isometric view of the head of the needle illustrated at Fig. 16.

Figure 18 (Sheet 7) is a rear side elevation of the machine as viewed substantially on the indicated line 18—18 at Fig. 1, with certain elements at the end of the machine shown in other views being omitted to conserve space.

Figure 19 (Sheet 7) is a section taken substantially on the indicated line 19—19 at Fig. 18 and illustrates spindle driving elements of the machine, in section, but illustrates the spindle head associated therewith in full to better show its relation with the driving elements.

Figure 20 (Sheet 8) is a section, on an enlarged scale, of the spindle head itself, as taken substantially on the indicated line 20—20 at Fig. 4, the rotating parts within the head being illustrated in full to better show their relation with the head, and other elements being rotated to positions to better illustrate the construction of radially disposed parts therein.

Figure 21 (Sheet 8) is a fragmentary section, on a further enlarged scale, as taken on the indicated line 21—21 at Fig. 20.

Figure 22 (Sheet 8) is a fragmentary detail of the elements of Fig. 21 as viewed from the indicated arrow 22 at Fig. 20.

Figure 23 (Sheet 8) is a fragmentary section as taken substantially on the indicated line 23—23 at Fig. 20.

Figure 24 (Sheet 8) is a fragmentary section, on a further enlarged scale, as taken substantially on the indicated line 24—24 at Fig. 23.

Figure 25 (Sheet 9) is a fragmentary section, on an enlarged scale, as taken substantially on the indicated line 25—25 at Fig. 19.

Figure 26 (Sheet 10) is a fragmentary section and plan of ribbon cutting and spool feeding elements as taken substantially on the indicated line 26—26 at Fig. 3.

Figure 27 (Sheet 10) is a fragmentary section as taken substantially on the indicated line 27—27 at Fig. 26.

Figure 28 (Sheet 10) is a fragmentary section as taken substantially on the indicated line 28—28 at Fig. 26.

Figure 29 (Sheet 10) is a fragmentary section as taken substantially on the indicated line 29—29 at Fig. 27.

Figure 30 (Sheet 10) is a fragmentary section and elevation of spool feeding elements as taken substantially on the indicated line 30—30 at Fig. 26.

Figure 31 (Sheet 10) is a fragmentary detail as taken substantially from the indicated arrow 31 at Fig. 30.

Figure 32 (Sheet 10) is a fragmentary section of elements illustrated at Fig. 30 and taken substantially on the indicated line 32—32 at Fig. 26.

Figure 33 (Sheet 10) is a fragmentary section as taken substantially on the indicated line 33—33 at Fig. 30.

Figure 34 (Sheet 9) is a fragmentary section of camming elements as taken substantially on the indicated line 34—34 at Fig. 18.

Figure 35 (Sheet 9) is a fragmentary section as taken substantially on the indicated line 35—35 at Fig. 18.

Figure 36 (Sheet 9) is a fragmentary section as taken substantially on the indicated line 36—36 at Fig. 18.

Figure 37 (Sheet 9) is a fragmentary section as taken substantially on the indicated line 37—37 at Fig. 18.

Figure 38 (Sheet 9) is a fragmentary section as taken substantially on the indicated line 38—38 at Fig. 37.

Figure 49 (Sheet 9) is an alternate construction of a conventional typewriter ribbon spool.

Figure 50 (Sheet 8) is an alternate construction of a spindle element adapted to receive a typewriter ribbon spool illustrated at Fig. 49.

Figure 51 (Sheet 9) is a plan view of an alternate form of a spool-feeding mechanism adapted to receive the spool illustrated at Fig. 49.

Figure 52 (Sheet 9) is a section as taken substantially on the indicated line 52—52 at Fig. 51.

Figure 1:
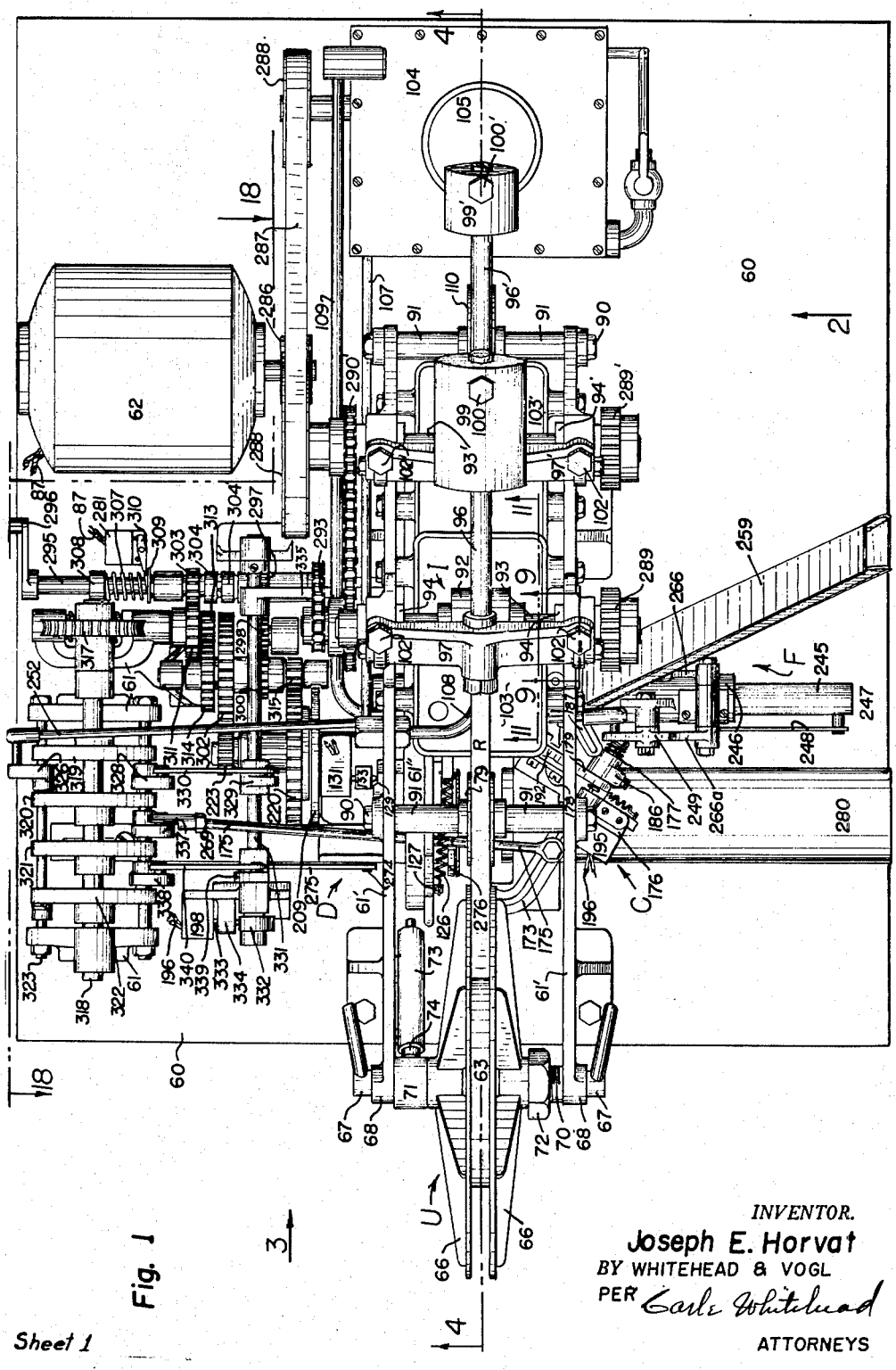
Figure 1 (Sheet 1) is a top view of the machine.
Figure 2:
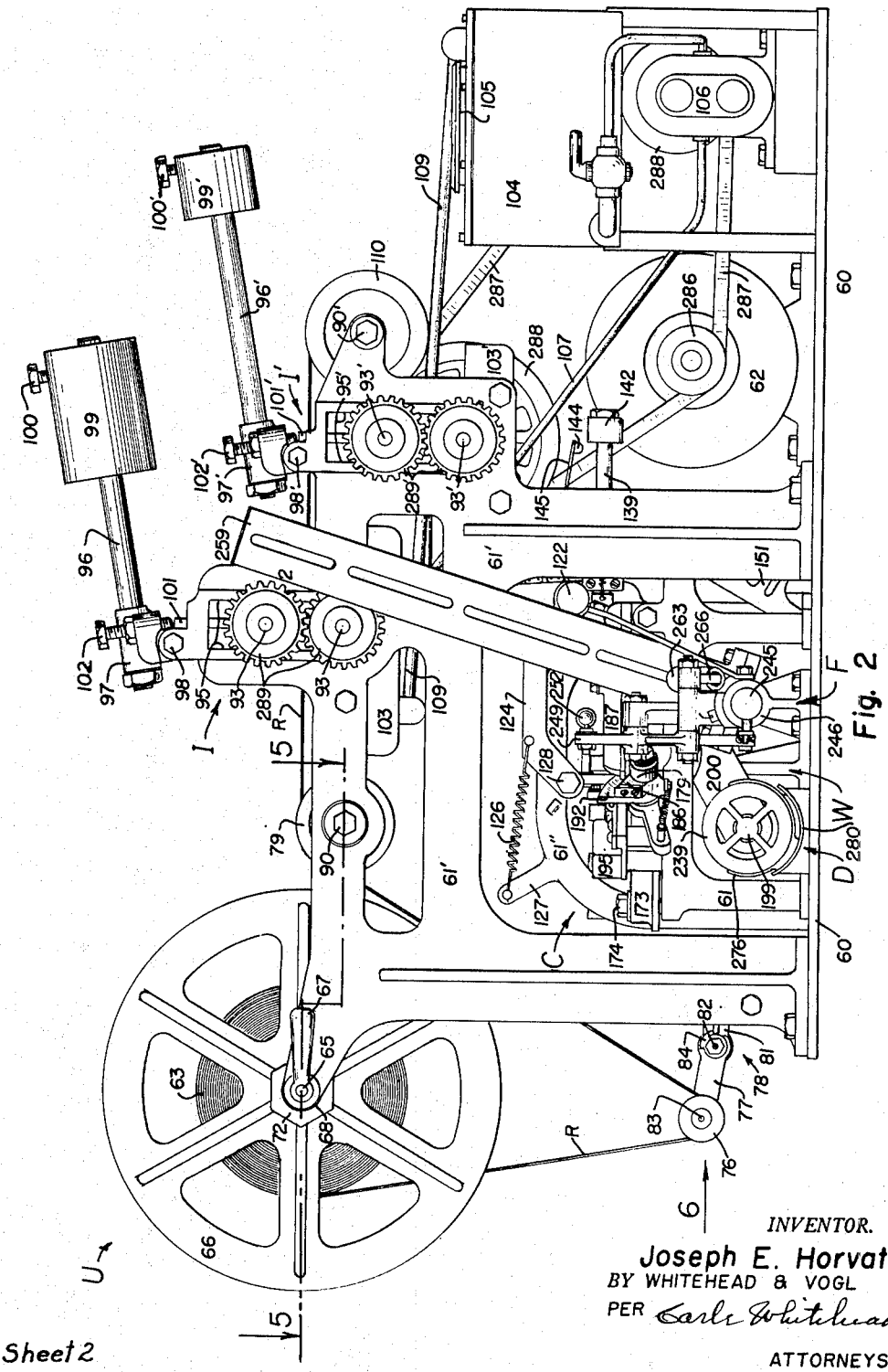
Figure 2 (Sheet 2) is a side elevation as viewed in the direction of the indicated arrow 2 at Fig. 1.

The demand for replacements of typewriter ribbon has caused the development of a large industry devoted to making typewriter ribbon spools, hereinafter referred to as spools, and to typewriter ribbons hereinafter referred to as ribbon. In the present state of the art the ribbon is furnished in reels having perhaps as much as 450 yards, and designated ribbon lengths of 9 to 18 yards, taken from this reel, are inked and wound upon a spool to provide a typewriter ribbon replacement unit. Although various ribbon inking means have been devised, and some winding aids have been developed, the inking and winding of a designated length of ribbon upon a spool is largely a hand operation, and heretofore no known equipment or machinery has been developed which unreels, inks and winds the ribbon onto a plurality of spools as a continuous operation.

There are several factors which in the past appeared to make such a machine impractical. First, where the ribbon is being payed from the reel continuously, but at intermittent rates, such as necessitated by changing spools, a ribbon inking means must be devised which applies ink uniformly to the ribbon at all times, in a manner to saturate the ribbon at a uniform predetermined consistency. Means must also be devised which wind the measured length of ribbon upon the spool, then cut the ribbon therefrom and discharge the wound spool, followed by the automatic connection of the ribbon to and winding it upon another spool to repeat the process. Since there are a number of different types of spools for use on various makes of typewriters, each radically different in construction, it has not, in the past, appeared feasible to devise an automatic winding machine adapted to accommodate all of the various different types of spools. Yet in the present invention means have been conceived and developed to provide the various functions of inking, connecting, winding, cutting and discharging the wound spools successively as a continuous operation with various types of spools, as hereinafter described, in a preferred embodiment of my invention.

This machine is formed of a combination of mechanisms which cooperatively act to ink and wind typewriter ribbon material R upon a spool S and comprises a ribbon unreeling apparatus U, a ribbon inking apparatus I, a ribbon spool engaging apparatus E, a ribbon winding apparatus W, a spool feeding apparatus F, a ribbon cutting apparatus C, and a discharging apparatus D. All of these apparatuses are operatively linked with actuating and camming apparatus, hereinafter described.

The elements constituting the machine are suitably mounted upon a common base 60 and are carried and held in position by framework members 61 upstanding said base. Two frame members 61' are oriented in spaced parallelism to the ribbon C and at opposite sides thereof to support therebetween various shafts, holding rollers and other elements over which the ribbon R passes. Other frame members act as journals to hold and properly orient other various members and mechanisms in their operative association with the entire unit. All elements are arranged to be operatively synchronized and run by a single motor 62, in a manner hereinafter described, said motor being preferably an electrical unit which will stop responsive to the opening of various switches as hereinafter described.

*The ribbon unreeling apparatus*

(Details at Figs. 5–8)

A conventional typewriter ribbon reel 63 comprises a substantial length of typewriter ribbon R wound around a cylindrical shell 64 to form a disc-shaped unit. This reel 63 and shell 64 are mounted upon journaling elements which are in turn held upon a rod 65 transversely interposed between and through the frame members 61', and said reel is further positioned and held between plate wheels 66 which prevent its distortion. The rod 65 is threaded at each end and hand nuts 67 are turned on the ends to rigidly connect the frame members 61'. These nuts 67 bear against bosses 68 of the frame members 61' through which the rod 65 extends, and are removable to permit withdrawal of rod 65 and removal of the reel assembly from the frame as for recharging. The rod 65 is reinforced, and the frame members 61' are rigidly spaced, by a shoulder shaft 69, concentrically slidable over rod 65, the ends of which bear against the inner walls of said frame members to provide a stable unit about which the reel may rotate. The plate wheels 66, with the reel 63 between, are mounted upon a cylindrical journal 70 which, in turn, is slidably and rotatably mounted upon the shoulder shaft 69, said journal 70 having a length slightly less than the shaft 69 to permit its rotation free of end binding against the frame members 61'. One end of the journal 70 is provided with an enlarged head 71, which provides a shoulder against which a plate wheel hub bears, the thickness of the head 71 and the adjacent plate wheel 66 being such that the reel 63 is centrally positioned between the framework members 61'. The other end of the journal 70 is threaded to receive a nut 72 which may be turned thereon against the other plate wheel hub whereby the reel 63 is held tightly between the two plate wheels 66 and the entire unit is held tightly upon the journal 70.

A cylindrical case 73 is mounted upon the interior wall of the frame member 61' adjacent the head 71, and contains a slidable piston 74, projectible as by a spring 75, to resiliently bear against the cylindrical wall of the head 71 to thereby brake rotation of the reel to prevent it turning by its own momentum. It follows that a definite force, as by a pull of the ribbon, is necessary to turn the reel and in this manner the ribbon will not become slack but will remain taut throughout the unreeling operation.

The ribbon extends from the reel downwardly for a substantial distance where it is threaded around an idle roller 76 mounted upon the pivot arm 77 of a cutout element 78, thence upwardly and over a second idle roller 79 whose periphery is aligned with inking roller elements hereinafter described.

The cutout element 78 comprises a base 80 mounted upon a framework member 61'. Suitable lugs 81 outstand this base 80 to support a horizontally disposed shaft 82 of the pivot arm 77 to permit altitudinal movement of said idle roller 76. This idle roller 76 is mounted upon a shaft 83 on the pivot arm in spaced parallelism with the shaft 82 and is normally held at an upward position above its support shaft 82 by the brake-imposed tension upon the ribbon R with said upward position suitably limited by a stop 84 on the pivot arm 77 which bears against the base member 80. The shaft 82 is cammed at the end remote of the pivot arm 77 as at 82' to provide slidable movement of a follower 85 bearing against the cammed surface and associated with the actuator pin of a conventional micro-switch 86 to open said switch responsive to dropping of the pivot arm 77. The micro-switch 86 is in the power supply circuit 87 and operates to open all circuits. The drop of this pivot arm 77 to open such circuits normally occurs whenever the ribbon R is completely unwound from the reel 63. In this manner the apparatus is stopped and will not operate again until a new reel of ribbon is mounted and the loose end thereof is attached to the loose end of the previously unwound ribbon whereupon the ribbon may be manually wound upon the reel until the tension lifts the arm 77 to close the micro-switch 86 and start the operation anew.

The idle roller 76, mounted upon the shaft 83, is simply a flanged type spool rotatable on shaft 83 with suitable side washers 88 adapted to eliminate sideward binding. The shaft 83 is conveniently formed as a headed pin which may be inserted through the roller and washers, thence into a socket in the pivot arm 77 and locked in position by a set screw 89, all as clearly illustrated at Fig. 8.

The second idle roller 79, to which the ribbon passes from the roller 76, is of analogous construction to the roller 76, although it is mounted upon a shaft bolt 90 carried transversely of the ribbon path by the frame members 61'. This roller 79 is held in alignment with the ribbon path by tubular spacers 91 mounted upon the shaft bolt 90 at each side of the roller, and is altitudinally positioned to permit its periphery at the top to be in substantial horizontal alignment with the roller peripheries of the inking apparatus I to which the ribbon passes after leaving the roller 79.

*The inking apparatus*

Figure 4:
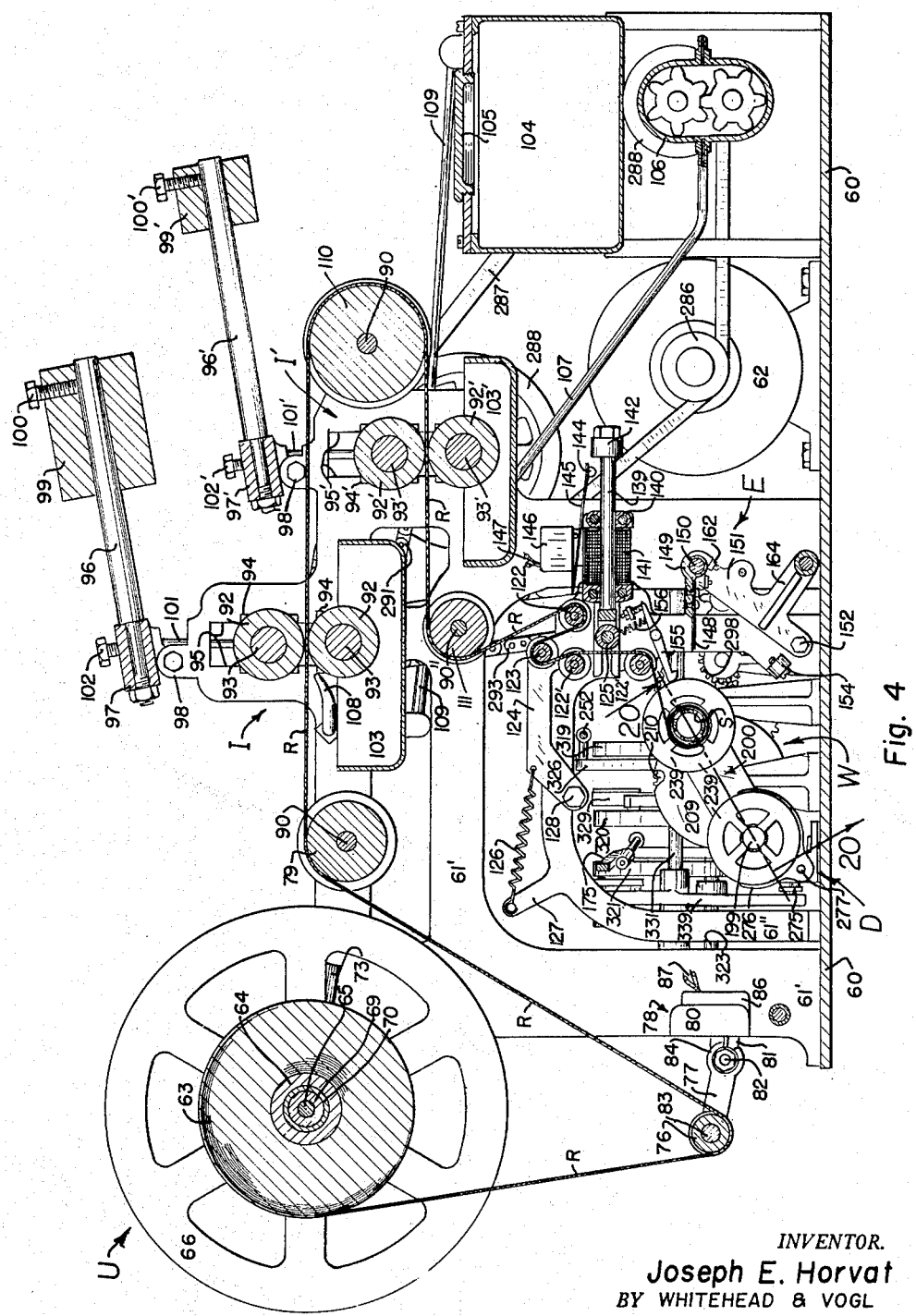
Figure 4 (Sheet 4) is a central longitudinal section as taken substantially on the indicated line 4—4 at Fig. 1.
Figure 5:
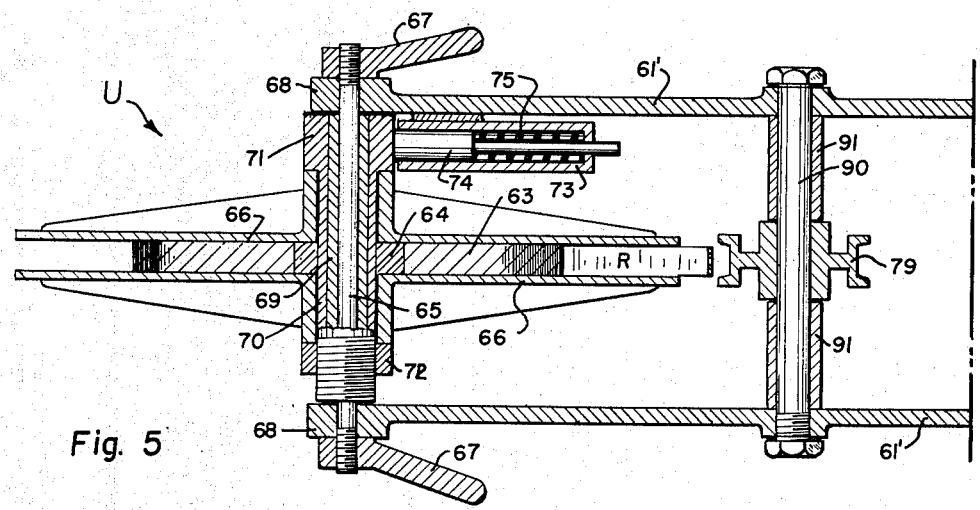
Figure 5 (Sheet 5) is a fragmentary section, on an enlarged scale, as taken substantially on the indicated line 5—5 at Fig. 2.
Figures 6, 7, 8:
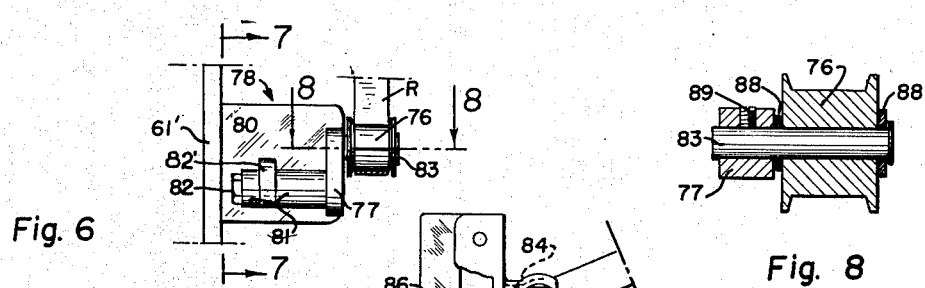
Figure 6 (Sheet 5) is a fragmentary detail of elements as illustrated at Fig. 3, on an enlarged scale, and viewed substantially from the indicated arrow at Fig. 2.
Figure 7 (Sheet 5) is a fragmentary detail, partly in section to show otherwise hidden elements, as viewed from the indicated line 7—7 at Fig. 6.
Figure 8 (Sheet 5) is a section, on a further enlarged scale, as taken on the indicated line 8—8 at Fig. 6.
Figures 9, 10:
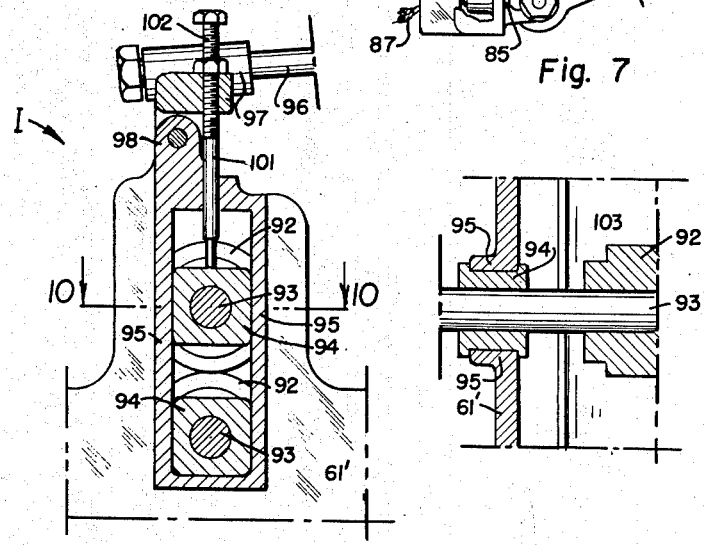
Figure 9 (Sheet 5) is a fragmentary section, on an enlarged scale, as taken substantially on the indicated line 9—9 at Fig. 1.
Figure 10 (Sheet 5) is a fragmentary section taken on the indicated line 10—10 at Fig. 9.
Figure 39:
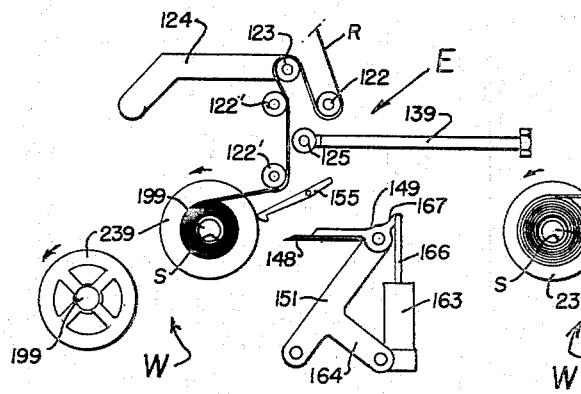
Figures 39 through 44 (Sheet 11) are diagrammatic illustrations of ribbon winding, cutting, and threading elements illustrating in sequence various steps of operation.
Figure 40:
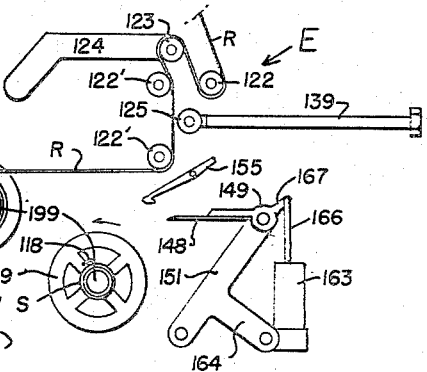

(Details Figs. 4, 9 and 10)

The ink for typewriter ribbons is a pigmented viscous fluid having an affinity for, and being readily adsorbed into, the ribbon material and other similar organic substances, but not tending to adhere strongly to the surfaces of other substances such as certain metals. It follows that such properties of the ink render the transference from a container onto a metallic roller and thence onto the ribbon somewhat difficult after an inking roller has operated over a period of time, for the roller surface will become polished by the ribbon and the ink will not adhere thereto and cannot be carried to the ribbon in uniform consistency, if at all. To overcome this condition, hardened and specially conditioned rollers are commonly used. The ink-feeding structure in this apparatus has avoided the necessity for specially constructed inking rolls, and the ribbon R, leaving the roller 79, is directed between a pair of inking rollers 92 formed of ordinary metallic material. These rollers are mounted transversely of the ribbon path upon shafts 93 which are carried by journal boxes 94 at each end of the shafts. These journal boxes 94 are slidably held in upstanding ways 95 formed in each of the frames 61', the lower journal boxes 94 being fixedly held at the lower ends of said ways 95 and the upper journal boxes being adapted for altitudinal movement to compress the upper roller 92 against its lower mate.

Positive measured pressure of the upper roller against the lower roller is obtained through weighted lever arm 96 carried by a transverse head 97 pivotally attached at each end to upstanding lugs 98 of the frame members 61' above the ways 95, with the lever arm 96 outstandingly extending from the head 97 to slidably carry a weight 99 which is adapted to be secured thereon at selected positions by a screw 100 to acquire a given pressure to regulate the amount of ink picked up by the ribbon. The torque created by weight 99, on the arm 96, extended from the pivoted head 97, acts through pins 101, slidably disposed above the ways 95 adjacent the pivot points of the head, to bear upon the upper journal boxes 94 and press the upper roller 92 against the lower. The pins 101 are contacted by adjusting screws 102 which are positioned at each side of the head 97, and the adjusting screws 102 permit a lateral balancing of pressure of the upper shaft 93 and its roller 92. This is necessary to force the ribbon to pass through the rollers without sidewise creeping.

An inking trough 103 is mounted beneath the rollers to catch all ink placed on the rollers which is not absorbed by the ribbon. While ink tends to pass from this trough onto the lower roller, such action is not relied on to ink the ribbon because, as before stated, the rollers tend to become polished and glazed over a period of use and the ink will not readily adhere thereto, especially under high speed operation. Therefore, an ink circulating system is provided in the present apparatus which will positively apply ink to the ribbon in a continuous stream, the excess returning to the trough. This circulating system includes a reservoir 104 suitably positioned away from other apparatus to provide easy filling thereof as through a lid 105 without any chance of spilling ink upon other elements. A conventional gear pump 106, is operated by the motor 62 through a pulley belt arrangement hereinafter described. A suitable pressure line 107 extends from this gear pump 106 to the leading face of the lower roller 92 above the trough 103. The line 107 exit is formed as a horizontally flattened nozzle 108 adapted to spray a jet of ink directly against the ribbon as it enters the rollers 92. The ink draining from the lower roller into the trough 103 passes into a drainline 109 to thereby return to the reservoir 104.

The ribbon R continues through the inking rollers 92 in a horizontal path, to engage an idle roller 110 which is mounted upon a shaft bolt 90 and held in position between tubular spacers 91, the idle roller 110 being similar in construction and function to the idle roller 79. The ribbon passes around this roller and is thereby turned 180 degrees and directed into a second inking unit I'.

This unit I' comprises a pair of rollers 92' mounted upon shafts 93' transverse of the ribbon path. These shafts 93' are carried in journal boxes 94' mounted in ways 95' in the frame members 61', the construction being similar to the elements hereinbefore described as to unit I. Further, the upper roller is compressed against the lower roller through the agencies of an arm 96' mounted upon a head 97' pivotally suspended by lugs 98' of the frame 61'. This lever arm carries a weight 99' positioned selectively and there secured by a screw 100', and the torque caused thereby is balanced by pressure against pins 101' which bear against the journal boxes 94' as in the unit I. Likewise, adjusting screws 102' are provided upon the head 97' to regulate the evenness of the pressure of the upper roller 92' against its lower mate. This unit is provided with trough 103'. However, no inking facilities are used in this second unit of the presently described embodiment, as a second inking is ordinarily unnecessary with any type of ribbon which readily absorbs the ink. Should inking on both sides be necessary, this construction provides facilities for such inking on both sides of the ribbon as the reversing of the ribbon direction around the idle roller 110 permits positive flow means by a nozzle similar to nozzle 108, and it is only necessary to provide inking supply and drain lines in the unit I'.

The ribbon R passes through the rollers 92' and in a suitable horizontally disposed direction onto an idle roller 111 which is mounted upon a shaft bolt 90 and positioned by tubular spacers 91 as is the idle roller 110. From this idle roller 111 the ribbon is directed onto other rollers and past elements comprising the ribbon spool engaging apparatus E and thence onto the ribbon winding apparatus W.

*Ribbon spool engaging apparatus*

(Details at Figs. 4, 11–17)

The typewriter ribbon spools of the various machines assume different forms. The spool S, illustrated at Figs. 45 and 46 (Sheet 3), is a type adapted for standard Remington noiseless typewriters and comprises a cylindrical ring 113 having the same width as the typewriter ribbon it is adapted to carry. This spool is formed by rolling a flat strip of metal to circular shape with the ends 114 inwardly crimped and joined by a tongue 115 which fits in suitable punched holes to interlock the unit. Another conventional type of spool S' is illustrated at Fig. 49, Sheet 9, and comprises a similar cylindrical ring 113' having thereon outstanding flanges 116 and other suitable appendages 117 such as are necessary for the various conventional makes of typewriter.

In all conventional spools there is provided a peripheral ribbon connecting hook 118, suitably formed as a circumferentially outstanding shank 119 ending in a pointed expanding head 120. This shank and head may be attached to the ring 113 in any suitable manner or may be formed as a punching lifted from the ring. In use, the end of a ribbon is engaged to the hook by passing the head through a transverse slit 121 (Fig. 47) in the ribbon near its end, whereby the ribbon lodges upon the shank. In the herein described embodiment the ribbon spool engaging apparatus E is adapted to cut said transverse slit 121 at an end of the ribbon R and to then direct the ribbon against the spool in such a manner as to permit the hook 118 to pass into the slit, whereupon the enlarged head 120 of the hook holds the ribbon end upon the shank 119 to permit it to be wound upon the spool, the spool being rotatably mounted upon elements hereinafter described.

The ribbon passing from the idle roller 111 is directed downwardly and around a small idle roller 122 which is outstandingly and rotatively secured to a frame member 61'' within the area included in frame 61' as upon a shaft 83' in manner similar to the hereinbefore described idle roller 76. The ribbon is thence directed upwardly and around an idle roller 123 mounted upon a shaft 83'' carried by a tension arm 124, thence downward and along a pair of vertically aligned idle rollers 122' mounted on shafts 83', and thence past the cutting apparatus and onto a spool associated with the winding apparatus, both hereinafter described. The construction of shafts 83' and 83'' is similar to that of shaft 83, Fig. 8. The idle rollers 122' are suitably spaced to permit passage of a horizontal thrust roller 125 therebetween as hereinafter described. The ribbon spool engaging means engages the end of the ribbon, when cut upon completion of the winding of a spool, forms a slit in such end for its engagement with the next spool to be wound and engages the slit end with such spool. This apparatus will now be described.

The tension arm 124 is pivotally mounted upon the frame member 61'' so that it may be swung upwardly away from the idle rollers 122 and 122', and a tension spring 126 attached to an upper point of the arm and to an outstanding leg 127 on the frame member 61'' tends to thus draw the arm upwardly. The tension of the ribbon R normally holds the arm 124 in lowered position, but upward movement of the arm occurs responsive to slacking of the ribbon. The tension arm accordingly functions to take up such slack and to provide tension on the ribbon at all times.

The upward movement of the arm 124 functions, first, to take up ribbon slack, as stated, and, secondly, to shut off the machine whenever the arm is raised to a position beyond which any normal operative ribbon slack would occur. Thus, the arm, being associated with means to open the motor circuit 87' to shut off the motor 62, acts as a safety device responsive to abnormal conditions, as when the ribbon fails to operatively engage a spool.

The pivotal mounting of arm 124 is upon a shaft 128 which extends through and beyond the frame 61'' and there carries a face cam 129. Adjacent the face cam 129 there is mounted, upon the frame member 61'', a bracket 130 carrying a micro-switch 131 in series with the motor circuit 87' whose actuating pin is associated with a follower 132. This follower is slidably mounted within a lug 133 upstanding from the bracket 130, and the actuating pin of the micro-switch 131 resiliently holds the follower 132 against the face cam 129. The follower 132 functions to actuate the pin of the micro-switch 131 to open the motor circuit 87' as step 134 in the face cam 129 moves past the follower, said step 134 being arcuately disposed to permit the tension arm to lift sufficiently to take up normal ribbon slack before contacting the follower to open the circuit 87'.

The thrust roller 125 is adapted to move between the two idle rollers 122' to carry the ribbon with it as at Figs. 42–43 and thereby impart a reverse pull to the ribbon as the spool engaging apparatus E and the ribbon cutting apparatus C become operative to cut the ribbon and engage the end to an unwound spool as later described. This roller is mounted upon a shaft 135 in guide 136, which carries an outstanding lug 137 slidable between two ways 138 on the frame 61''.

An actuator shaft 139 extends from the guide through, and is slidable in, a pair of journals 140 outstanding the frame 61'' and a solenoid 141 between the journals. This shaft is formed of two different materials suitably joined together. The rear portion 139' extends beyond the journal most distant from the guide 136, and is of a magnetic responsive material, while the forward portion 139'', adjacent the guide 136, and normally within the solenoid 141, is of non-magnetic material, whereby the energizing of the solenoid 141 by a circuit, hereinafter described, causes the rear portion 139' of the shaft to be drawn into the solenoid thereby forwardly extending the thrust roller 125.

The forward movement of the shaft 139 is limited by a collar 142, affixed to the shaft 139', which strikes the face of the adjacent journal 140.

Collar 142 carries a cam 143 adapted to strike and lift a roller 144 located at the outer end of an actuating arm 145 of a micro-switch 146, suitably mounted upon the frame 61''. The lifting of the roller 144 and the arm 145 by cam 143 closes a circuit 147 of the micro-switch 146, which is associated with those mechanisms which act to thread the ribbon onto a spool subsequent to the movement of the thrust roller 125 as hereinafter described.

The actual transference of the cut end of the ribbon onto the hook 118 of an empty spool is accomplished through a needle 148, which extends from a hub 149 which is swingably mounted, as by a pin 150, upon a rocker arm 151. The rocker arm, in turn, is pivotally attached to the lower portion of the frame member 61'' by a shaft 152, which extends through and beyond the frame member and there carries a crank arm 153. The arm 153 is linked with mechanisms, hereinafter described, to tilt the rocker arm toward the ribbon winding apparatus and into a field of action during the operation of engaging the ribbon. This tilting movement is limited by an adjustable stop 154 on frame 61''.

A hooked detent 155 is pivotally mounted upon the frame 61'' above the shaft 152 and is resiliently held in a selected downward position by a spring 156 and an adjustable stop 157. This detent 155 is adapted to momentarily contact an outstanding lug 158 eccentrically positioned upon the hub 149 to rotate the hub and thereby raise the needle 148 as it moves past the detent 155 during the tilting movement of the rocker arm 151, counter-clockwise from the position shown at Fig. 11. This rotation of the hub and lifting of the needle 148 permits the needle to slidingly contact the under side of the ribbon between the lower roller 122' and the cutting device later described. The needle 148 is resiliently held in either the normal or the lifted position by a spring 159 which connects an eccentric post 150 on hub 149 and a similar post 161 on rocker arm 151. When the needle is down in normal position, as shown at Fig. 11, the posts are so offset that the spring is at one side of the pin 150 and thereby holds the needle in said lowered position. When the rocker arm 151 is tilted and the needle 148 is lifted the post 160 shifts the spring to the opposite side of the pin 150 to exert a pull which holds the needle in said raised position. Suitable stops 162 are positioned on the rocker arm 151 to provide limits for the downward and upward movements of the needle.

Figure 41:
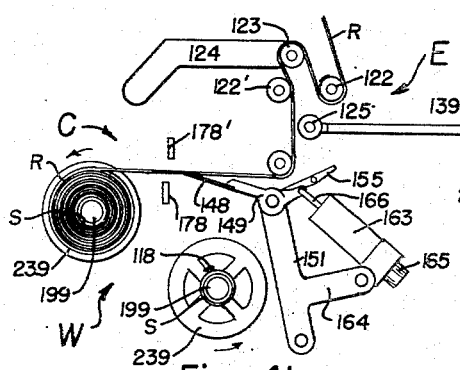
Figure 42:
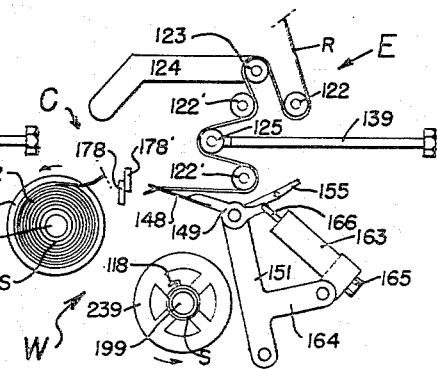
Figure 43:
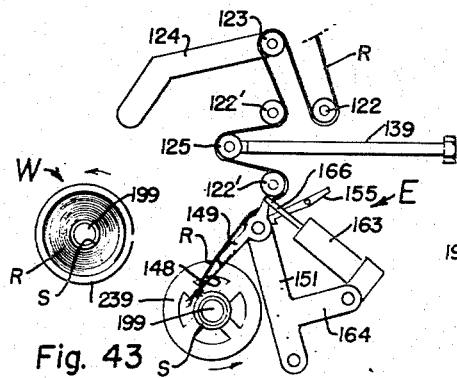
Figure 44:
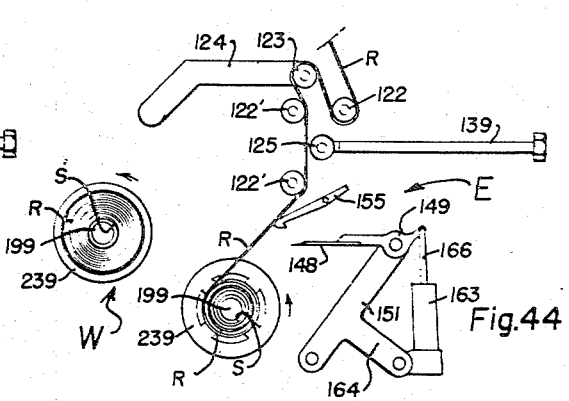

In the upwardly extended position the needle 148 is canted against and slidingly contacts the ribbon, and picks up the ribbon after it is cut and its movement reversed by extension of the thrust roller 125, all as illustrated at Figs. 41 and 42. Next, the needle is shifted downwardly and against a spool S to thread the ribbon onto a hook 118 as illustrated at Fig. 43. A solenoid 163 is pivotally mounted upon an outstanding arm 164 of rocker arm 151 and carries an armature 165 connected to an arm 166 on the hub 149 by a shaft 167. This armature is adapted to move through the solenoid 163 to lower the needle and effect said downward shifting whenever the solenoid is energized. This solenoid is connected with the micro-switch 146 through the circuit 147, with the result that the downward movement occurs subsequent to the extension of the thrust roller 125 and after the needle 148 has engaged the ribbon R.

The needle 148 is formed of a comparatively thin strip of hardened material having a width corresponding to the ribbon width. The point is formed as a sharpened spearhead 168 outstanding from the needle and narrower than the needle width, but having a width sufficient to properly cut the transverse ribbon slit 121. This cutting of the slit 121 occurs when the needle is lifted upwardly with the spearhead 168 bearing against the ribbon and when the thrust roller 125 reverses the ribbon movement. It follows that the ribbon catches on the point of the spearhead 168 and is threaded thereover and held on the needle at the base of the spearhead against the abutments comprising the base of the spearhead of the needle 148. Suitable recesses 169 are provided at each side of this base to assist in retaining the ribbon end thereon until it is transferred onto a spool. This needle is inwardly arched at the head portion 170 to provide a suitable space wherethrough the point of a hook 118 of a spool S may pass in its movement to connect with the ribbon and remove the ribbon from the needle in a manner clearly illustrated at Fig. 47. In operation it is necessary to use a needle of hardened material, and the needle 148 is provided with a slot 171 at its base end to permit it to be adjustably attached to the hub 149 as by bolts 172.

*Ribbon cutting apparatus*

The ribbon cutting apparatus C is operatively interposed between the ribbon spool engaging apparatus and the ribbon winding apparatus W and is adapted to sever the ribbon from a wound spool at the same instant the thrust roller 125 moves forward to reverse the ribbon movement to thread the cut end of the ribbon upon the needle 148 as hereinbefore described. The cutting apparatus C is mounted upon an arm 173 which is pivotally attached to a frame member 61 by a bolt 174 to swing in a horizontal plane into and out of cutting alignment responsive to a pull or push of a rod 175 associated with elements hereinafter described. To carry the cutting apparatus the end of the arm is provided with a horizontally disposed base plate 176 with a shaft 177 extending therefrom. The cutter is of a shear type having one blade 178 fixed and extending from the base plate 176 and one blade 178' movable and extending from an arm 179 rotatably mounted on the shaft 177, said shear formed by the blades 178 and 178' being aligned transverse of the ribbon when the arm 173 is in cutting position. The blades 178 and 178' are formed of hardened material and are adjustably held in position by suitable bolts 180. To attain a tight shearing contact and to hold the arm 179 against the abutment formed by the juncture of the shaft 177 and the base plate 176, a spring 181 is threaded upon the outstanding end of the shaft 177 and is resiliently forced against the arm 179 and held thereagainst by a washer nut 182 at the end of the shaft 177. Another spring 183 is connected with a lug 184 outstanding from the base plate 176 and a stud 185 on the arm 179 to resiliently hold the shear blades 178 and 178' in a normally closed position.

A peripheral cam 186 is mounted at one side of the arm 179 and is adapted to bear against the tip of a guide 187 to thereby lift and open the blade 178' as the arm 173 moves into cutting position, the apparatus being adapted to move these open blades 178 and 178' to each side of the ribbon to thereby effect a severance by their closure. The closure occurs suddenly with the blades in position transverse of the ribbon through the ridge 188 of the cam 186 sliding off the tip of the guide 187. Because of the nature of the movement of the cam, the portion forming the ridge 188 is preferably of hardened material held on the head 179 as by bolts 180', as shown at Fig. 28.

The guide 187 comprises a rocker arm pivotally mounted upon the frame 61'' as by bolt 189. The guide arm opposite the contact tip is adapted to bear against an abutment 190 to remain stationary as the arm 173 moves the blades 178 and 178' to cutting position whereby the cam 186 must react with the guide 187 tip to lift the blade 178'. However, the guide will swing aside as the arm 173 returns from the cutting operation after the closure of the blades 178 and 178'. A spring 191 is attached to the guide 187 to resiliently hold it against the abutment 190 and to return the guide to its position against the abutment 190 to be positioned for another cycle of movement of the arm 173.

A radially disposed face cam 192 is mounted upon the arm 179 adjacent the peripheral cam 186, and is operative with rotation of the arm 179 to extend or retract a follower 193 which is mounted upon the base plate 176 in an upstanding lug 194. This follower 193 is connected with the actuator pin of a micro-switch 195 also mounted on the base plate 176, and is operative to close the circuit 196 of the switch 195 with the shear blades closed, and to open the circuit 196 with the shear blades raised as through a step 197 on the face cam 192.

The circuit 196 is connected in series with the solenoid 141 hereinbefore described, and is also in series with another micro-switch 198 in the camming portions of the apparatus as hereinafter described. In operation the micro-switch 195 is normally closed and is adapted to be opened by lifting the blade 178' while micro-switch 198 is normally open, and is adapted to be closed subsequent to lifting the blade 178' and to remain closed for a short period after the blade 178' drops to cut the ribbon whereby the circuit 196 is closed to energize the solenoid 141 and extent the thrust roller 125 at that instant subsequent to the cutting of the ribbon by the blade 178'. The circuit is adapted to remain closed only for a short period of time as hereinafter described.

Ribbon winding apparatus

The ribbon is wound upon a spool S (Fig. 45) mounted upon a rotating spindle 199 (Fig. 20) of a rotatable shifting head 200, and through the agency of said shifting head, the spindle is positioned at various stations to accomplish the steps (illustrated at Figs. 39 to 44) of placing a spool thereon, threading, winding and cutting the ribbon and discharging the wound spool therefrom. It is desirable to have a plurality of spindles 199 upon the shifting head 200 to permit a spool to always be available so that the ribbon may be wound continuously upon a spool except for that short interval which is necessary to shift the ribbon from a wound spool to an unwound spool and, in the herein described embodiment, two spindles 199 are positioned upon the shifting head in diametrical opposition with respect to the shifting head axis.

The shifting head 200 comprises a base 201 and a cover 202 suitably attached to the base 201 as by bolts 203 to form a rectangular-like case at the ends of which the spindles 199 extend outwardly of the cover face through suitable journaled openings 204 in the cover and in the base. At the opposite face of the shifting head, at the central axis, a hollow shaft 205 extends from the base 201 and is mounted in a journal 206 of a frame member 61, which rotatably carries the shifting head, the shaft 205 being in spaced parallelism with the spindles 199. The journal 206 is in two portions with an opening between and in the central open space an indexing head 207 is secured to the shaft 205 for rotation therewith.

This indexing head comprises a sleeve 208 having a disc 209 at one end. The disc is provided with four seats 210 on its periphery which are arranged in diametric pairs, each being adapted to permit the two diametrically opposed spindles to be set in four given sequential positions through a roller arm 211 on a detent 212 falling into one of the seats. This detent 212 is pivotally attached to the frame member 61 and carries the roller arm 211 at its outward end in spaced parallelism with the spindle axis whereby the roller is adapted to ride the disc 209 periphery and to fall into each of the seats 210 as they successively move into registration with the roller arm 211. A spring 213 is mounted upon the detent 212 to hold the roller arm positively against the disc 209.

Rotation of the shifting head 200 and the indexing head 207 mounted thereon is effected through a gear head 214 rotatably mounted upon the sleeve member 208 between the disc 209 and a capping washer 215, held, as by screws 216, against the end of the sleeve 208 opposite disc 209. A friction disc 217, of material such as fibre, is interposed at each side of the gearhead to bear against the disc 209 and washer 215. A positive uniform pressure is exerted by these discs through a plurality of compression springs 218 mounted in suitable recesses 219 of the gearhead 214 and the indexing head 207 to permit slippage of gear 214 when the indexing head is locked in position by the detent 212.

The gearhead 214 is formed as a spur gear 220 which is driven at a uniform rate of rotation by elements hereinafter described, and a lift pin 221 suitably disposed alongside the disc 209 to contact and lift the roller 211 from a seat 210 in the course of its rotation. It follows that the operation of the shifting head and the indexing head attached thereto is by rotation of the gearhead 214 but with the shifting head remaining stationary and in a locked position through the agency of the detent 212 for certain periods regulated by the lift pin 221, during which periods slippage occurs at the discs 217. Whenever the lift pin 221 disengages the detent roller arm 211 from a seat 210, the shifting head rotates with the gearhead until the detent 212 drops in the next following seat 210 to again halt the movement of the shifting head.

The spindle driving mechanisms comprise a shaft 222 mounted in the hollow shaft 205 with one end extending beyond the shaft 205 to carry a pinion 223 which is driven by other elements hereinafter described. The other end of the shaft 222 extends into the shifting head and carries a gear 224 thereon, which is connected to pinions 225 on the spindle shafts 199 through suitable idle gears 226, said idlers being symmetrically disposed in the head 200 to provide a uniform rate of rotation of the pinions 225 on the spindles.

The rotation rate of the spindles must necessarily vary from a maximum, as the ribbon commences to wind upon the spool, to a minimum as the ribbon becomes fully wound, for the ribbon is necessarily fed to the spools uniformly in its passage through the inking rollers 92 and 92'. However, the rate of rotation of the pinions 225 is constant by virtue of the arrangement of driving mechanisms hereinafter described, and it follows that slippage must occur between the pinions 225 and the spindles 199. Further, with slippage, the rate of rotation of the pinions 225 must be sufficient to attain a slight excess of the maximum desirable speed to keep the ribbons fully taut in winding. The pinions 225 are rotatably mounted upon the spindle shaft 199 between a flanged collar 227, integral of the shaft 199, and a collar 228 slidable upon the shaft 199 and held thereto as by a set screw 229, with fibre discs 230 between the abutting surfaces. Suitable compression springs 231 are circumferentially interposed in the collar 227 to hold the discs against the pinion with even uniform pressure to impose a definite frictional force between the pinion 225 and the spindle shaft 199. A pin 232 is set into the collar 227 and adjacent fibre disc 230 to prevent its rotation about the disc and thus eliminate unreasonable wear which would result from dragging of the disc 230 against the ends of the compression springs 231.

The construction of the elements associated with the spindle 199 necessarily depends upon the type of spool being used, and in view of this condition the spindle shaft, herein designated as 199, is adapted for various attachments, and comprises a hollow member mounted in the shifting head 200 and is thereby adapted to carry said attachments through the hollow interior. For the spool S of Fig. 45, this attachment comprises a hollow tube 233 threaded at one end and carrying an enlarged hollow mandrel 234 at the other end. The threaded end is adapted for insertion through the spindle shaft 199 and secured therein by a nut 235.

The mandrel diameter is such as to permit a ring 113 to be slidably positioned thereover and the outer periphery is provided with longitudinal grooves 236 to permit the inwardly turned ends 114 of the ring 113 to fit therein at any position of the rotating mandrel, and to become locked in such position. This mandrel 234 is further modified by longitudinal openings 237 through which the spokes 238 of a guiding disc 239 extend to a hub 240 interiorly of the mandrel, the guiding disc 239 being adapted to hold the ribbon evenly upon the spool and to eject a wound spool as hereinafter described. The disc 239 is carried by the hub 240 as by suitable bolts 241, and the unit is adapted for axial movement over the mandrel, the spokes being guided by the openings 237. To hold this disc 238 normal to the spindle axis, the hub 240 is attached to a stem 242 slidable in the interior portion of the tube 232. A spring 243 is attached to the interior end of the stem 242 and to the threaded end of the tube 233 by an interior nut 244 to resiliently hold the disc in a retracted position.

*Spool feeding apparatus*

Figure 47:
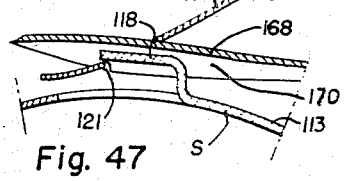
Figure 47 (Sheet 11) is an enlarged portion of a conventional spool, in section, and the ribbon pick-up needle, also in section, illustrating the positioning of the needle and spool at the instant the ribbon is transferred from the needle onto the spool.

In the ribbon winding operations the spindles are shifted to four different positions through movements of the indexing head, as hereinbefore explained, to permit a continuous cycle of operation. At that position which might be considered an initial position for such cycle of operation, an empty spindle is moved opposite the spool-feeding apparatus F to receive therefrom a spool S, which is pushed onto a mandrel 234 with the spool being so oriented that the head of the hook 118 thereon is pointed in the direction of rotation to properly pick up the ribbon as illustrated at Fig. 47. This apparatus comprises in essence a plunger 245 slidably positioned within a tubular carrier 246 attached to the base 60 by frame members 61. The plunger 245 is aligned in spaced parallelism with the spindles 199 and in alignment therewith at the position of registration. The end of the plunger 245 remote of the spindles extends outwardly from the carrier 246 and is provided with a stub 247 which is connected to a link 248, said link being in turn connected to a rocker arm 249 pivotally mounted, as by a bolt 251, upon a bracket 250 upstanding from the carrier 246. This rocker arm 249 is actuated through a push rod 252 which in turn is connected with other mechanisms hereinafter described.

The plunger 245 is cylindrical in form and of the same diameter as a spool ring 113, and is provided with a tubular recess 253 at the thrust end which has a diameter such that the end of a mandrel 234 will slidingly move therein. This recess 253 is normally end-closed by a piston 254 being held flush to the end of the plunger 245 by a spring 255 within the recess. In operation the mandrel pushes the piston within the recess 253 as a spool is pushed over the mandrel by the plunger. The piston is connected with the guide rod 256, centrally inserted in an opening in the plunger, which is provided with a longitudinal slot 257 to thereby limit the piston movement through a pin 258 inserted in the plunger 245 which extends inwardly into the slot.

To feed the spools into this carrier a supply clip 259 is suitably attached near the forwarding end of the carrier 246 to extend therefrom upwardly and outwardly of other elements in any desirable manner to provide a gravity feed, and said clip 259 may be of any length to accommodate a desired number of spools. This clip is simply formed of two side members 260 and end members 261 to provide a rectangular tubular passage slightly greater in width than a spool diameter, but not sufficient to permit misadjustment of a spool which is placed therein with the hook 118 suitably disposed at the top. This clip 259 may be charged by hand or by any suitable device which permits the proper insertion of a group of spools and is adapted to feed successively the spools to the plunger while regulating their movement by a stop pin 262 which is inserted into the clip near its discharge point. Pin 262 is mounted upon a base 263 extending above the carrier 246 and is adapted to resiliently retract itself from the clip by a spring 264 carried upon the stop pin between an enlarged end shoulder 265 thereon and the base 263. The movement permitting retraction of this pin 262 occurs through an offset bell crank 266 having one arm bearing against the shoulder 265. The bell crank 266 is suitably mounted in a frame 267 upstanding from the carrier 246 frame and the central portion comprises a shaft 268 positioned transversely of the plunger. The remote end 266a of the bell crank bears against the rocker arm 249, and the movement of this rocker arm to extend the plunger 246 is such that the bell crank lever 266 drops to extend the stop pin 262 from the clip 259 and drop a spool upon the extended plunger. This permits a second spool to drop into position to be caught by the pin 262 as it re-enters the clip, and to permit the freed spool to drop into an aligned position with the plunger inside the carrier interior as the plunger is fully retracted to its normal position. Separate means for stopping the machine when the clip runs out of spools are not necessary because this is accomplished through the movement of the ribbon spool-engaging apparatus, as the failure of the spool-engaging apparatus to contact the spool permits a ribbon slack to such a degree that the tension arm 124 will lift beyond its operative limit to shut off the machine as previously described.

*Spool discharging apparatus*

(See Figs. 19 and 25)

At that shifting head position of the spindles 199 preceding that at which they are in registration with the spool feeding apparatus F, the wound spools are discharged from the mandrels 234. This discharge is accomplished by moving a guiding disc 239 outwardly to the end of its mandrel and thereby pushing off the spool. The apparatus which moves the guiding discs is mounted upon a bar 269 which is carried above the base 60 as by pins 270 alongside the shifting head 200 and in spaced parallelism with the spindle axes, said pin engaging the bar in elongate slots 271 to thereby permit slidable shifting movement of said bar on the pins 270. A structural angle member 272 is attached to this bar at the end adjacent to the shifting head, as with screws 273, the upright leg of which is adapted to carry a pin 274, pivotally connecting the bar 269 with an actuating link 275 associated with other mechanisms, hereinafter described, which operate to extend the bar 269.

At the end of the bar 269 and on the angle base 272 adjacent the shifting head 200, there is a pivotally mounted semi-ring 276 transversely of the spindle axes and positioned to slidingly engage the face of a guiding disc 239 as the bar is pushed outwardly to extend the guiding disc. The pivotal mounting comprises a pin 277 at the side of the semi-ring 276 which engages a lug 278 upstanding from the base of the angle member 272, and is adapted to lower the semi-ring out of the way as the shifting head 200 rotates to change positions. The semi-ring 276 is resiliently held in operative position by a spring 279 suitably connected to the leg of the angle member 272 and the semi-ring.

The discharge of the wound spools through the extension of the above-described apparatus is into a semi-circular trough 280 which is mounted upon the base 60 outwardly of the spindle position to receive a plurality of spools with the discharge of a given spool pushing previously discharged spools into the trough and away from the machine.

*The actuating and camming apparatus*

(Figs. 1, 2, 18, 19 and 48)

The actuation of the inking, spool engaging, ribbon cutting, ribbon winding, spool feeding and spool discharging apparatuses is by a motor 62 and various solenoids herebefore described. The circuit 87 comprises a motor circuit 87' connected in series with micro-switches 131 and 281 which operate as shut-off elements should any undesirable condition occur, the switch 281 being hereinafter described. A general, manually operated, shut-off switch 282 is also provided to open or close both circuits 87, 87', 147 and 196. It is desirable to maintain the circuits 147 and 196 at a lower voltage than the circuit 87; therefore, these circuits are conveniently stepped down in voltage by a transformer 283, with the circuits 147 and 196 connected with the secondary of said transformer in parallel and with the primary of transformer 283 and the circuit 87' in parallel in circuit 87. Should the voltage in the circuit 196 be such that the solenoid actuation is too strong, a suitable resistor 284 may be placed therein in series. Likewise, a resistor 285 may be placed in series in circuit 147.

The motor is provided with a pulley 286 which carries a belt 287 around pulleys 288 on the gear pump 106 and on the lower shaft 93' of the inking unit I'. The opposite side of the lower shaft 93' is geared with the upper shaft 93' through suitable spur gears 289' to thereby drive both shafts synchronously. The upper shaft 93' carries a sprocket 290' at the side opposite the gears 289' which is connected to a sprocket 290 on the lower shaft 93 of the unit I through a chain 291. Spur gears 289 drive the upper and lower shafts 93 of the unit I synchronously and at the same rate as the shafts of the unit I' and by this arrangement, uniform passage of the ribbon therethrough is assured.

Adjacent the sprocket 290 on the lower shaft 93, there is provided a sprocket 292 from which a chain 293 extends downwardly to a sprocket 294 which is mounted upon the master drive shaft 295 of the apparatus to rotate the same. This master drive shaft 295 is held by suitable journaled frame members 61 in spaced parallelism with the inking shafts and other rotative elements, and is provided with two pinions to operate two trains of gear mechanisms and a crank 296 for manual adjustments. One pinion 297 is directly affixed to the shaft 295 to drive an idler gear 298 carried by a fixed shaft 299 held in a suitable frame member 61. This idler gear in turn drives a pinion 300 of a speed increaser element rotatably mounted upon a shaft 301 which actuates other gears hereinafter described; the large gear 302, of the increaser element, comprising the pinion 300 and gear 302, is connected with the pinion 223 on the spindle-driving shaft 222 hereinbefore described. The ratio of the gears in this train determines the amount of ribbon which is wound upon a spool.

The second pinion 303 on the master drive shaft 295 is rotatably and slidably mounted thereon and is provided with a head 304 which abuts a similar head 304' on the pinion 297, and circumferential grooves with suitable recesses 305, in the abutting faces of the heads 304 and 304', carry balls 306 between the heads. The heads are held together by a spring 307 mounted between a collar 308 on the shaft 295 and the side of the pinion 303 opposite the head 304 whereby, with the balls in the recesses 305, the pinions 296 and 303 turn together. However, should the pinion 303 be held from turning in any manner, as by jamming of the machine, the balls 306 lift from the recesses 305 to shift the pinion 303 along the shaft 295, and slippage then occurs between the two pinions.

A washer 309 is interposed between the spring 307 and the pinion 303 which contacts a finger 310 associated with the actuating pin of the microswitch 281 to open said switch and circuit 87' to stop the motor 62 as separation of the heads 304 occurs, so that a jamming of certain mechanisms will not cause damage to the unit through a continuation of the driving torque.

The pinion 303 is connected with a gear 311 of a speed reducer element which is connected to a shaft 312 suitably mounted in a journaled member 61 which carries elements hereinafter described. The pinion 313 of the reducer formed by the gears 311 and 313 is further connected with a gear 314 connected to the shaft 301 whereon the increaser element, comprising the pinion 300 and gear 302, is rotatably mounted. At the other end of the shaft 301 there is a pinion 315 connected thereto, and to the spur gear 220 on the gear head 214 hereinbefore described.

The shaft 310 carries a worm 316 which drives a wheel 317 mounted upon a shaft 318 by suitable journaled members 61, said shaft 315 being transverse of and above the drive shaft 295. This shaft is geared to rotate one revolution with the discharge of each spool and carries a plurality of disc-shaped cams 319, 320, 321 and 322 (Figs. 34-37) to actuate mechanisms hereinbefore described, and a fixed shaft 323 is positioned below and at each side of the shaft 318 in spaced parallelism therewith to provide mounts for the cam followers hereinafter described.

The cam 319 adjacent the wheel 317 has inscribed in its face a groove 324 wherein a roller 325 is rotatably positioned, said roller being held upon a follower 326 to thereby guide the follower movement according to the groove 324. This follower is formed as a simple lever mounted upon the outer fixed shaft 323 in an upstanding position with the top thereof connected to the push rod 252 of the spool feeding apparatus.

The groove 324 is of constant radius throughout the greater portion of its circumference, but has a single dip 327 positioned circumferentially to actuate the plunger 245 of the spool feeding apparatus at the instant a mandrel 234 is in proper registration.

The cam 320 has a similar groove 324a on its face wherein a roller 325a is positioned, said roller being held upon a follower 328 which is upstandingly mounted upon the inner fixed shaft 323. This follower is connected to an upstanding radial arm 329 by a link 330, said radial arm being mounted upon a shaft 331 disposed in spaced parallelism with the shaft 323, and rotatable in suitable frame members 61. At one end of the shaft 331 there is provided a cam 332 which actuates a follower 333 suitably mounted in a lug 334 on a frame member 61, said follower being connected with the actuator pin of the micro-switch 198 on the frame member. The microswitch 198 is in the circuit 196 of the ribbon cutting apparatus C hereinbefore described. The other end of the shaft carries a horizontally disposed arm 335 which is connected through a link-rod 336, Fig. 15, to the crank arm 153 of the rocker arm 151. The groove 324 of the cam 320 is of constant radius except for a dip 327a which is positioned circumferentially to actuate the rocker arm 151 to lift the needle 148 against the ribbon and also to close the switch 198 all as hereinbefore described.

The cam 321 carries a groove 324b on its face wherein a roller 325b is positioned, said roller being held upon a follower 337 which is upstandingly mounted upon the inner fixed shaft 323. The follower 337 is connected at its outer end to the push rod 175 of the ribbon cutting apparatus C hereinbefore described. This groove 324 is of constant radius except for a dip 327b which is positioned circumferentially to actuate the push rod 175 at the proper position of the ribbon for cutting.

The cam 322 carries a groove 324c on its face wherein a roller 325c is positioned, said roller being held upon a follower 338 which is connected to the upper end of a rocker arm 339, rotatably mounted upon the shaft 331 by a link 340. The lower end of this rocker arm 339 is pivotally connected with the actuating link 275 of the spool-discharging apparatus hereinbefore described. This groove 324 is of constant radius except for a dip 327c which is positioned circumferentially to discharge a wound spool as it comes into position in line with the discharging apparatus.

*Alternate constructions to adapt apparatus for other types of spools*

Figures 3, 45, 46, 48:
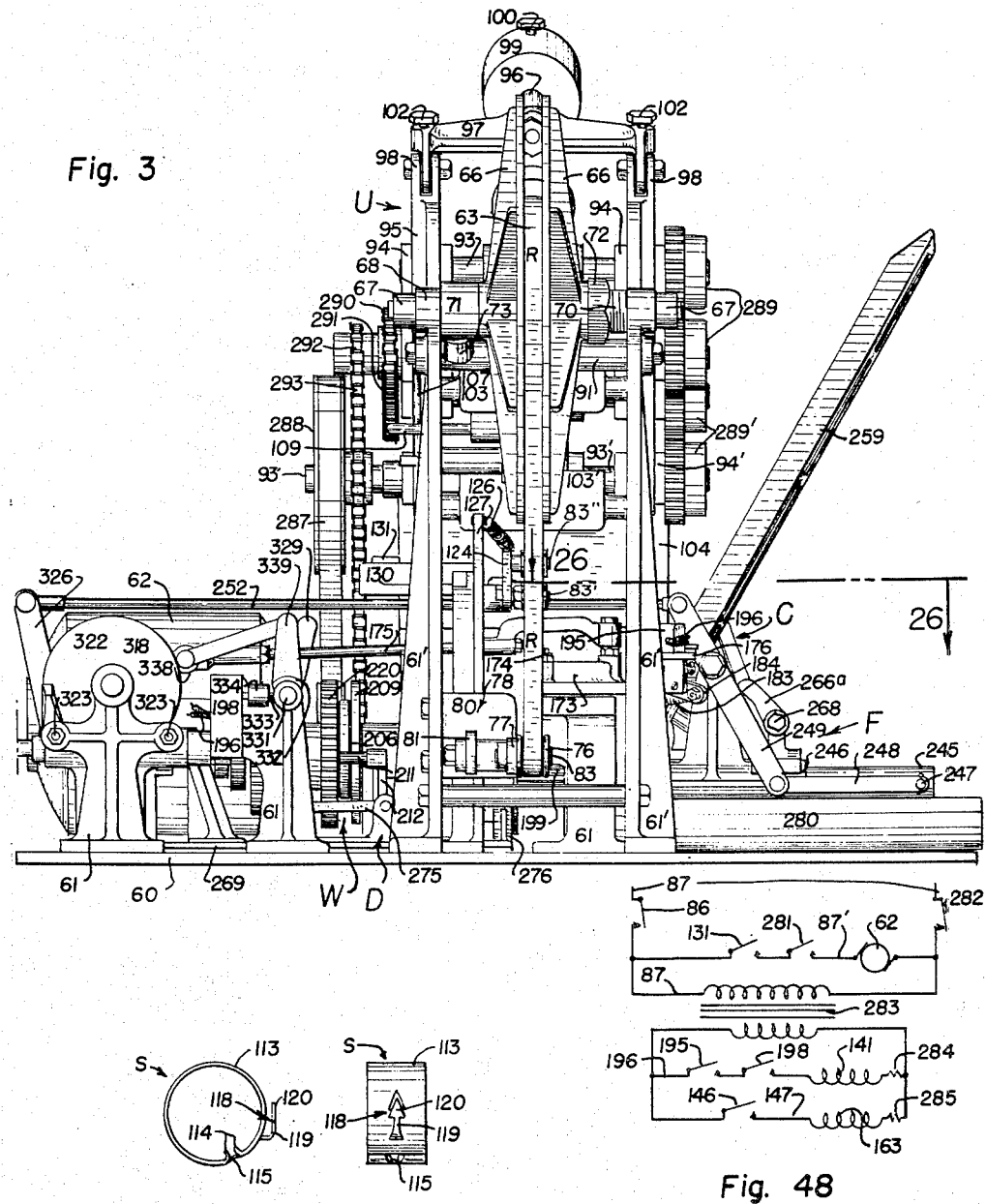
Figure 3 (Sheet 3) is an end elevation as viewed in the direction of the indicated arrow 3 at Fig. 1.
Figure 45 (Sheet 3) is an elevation of a conventional typewriter ribbon spool as viewed along the axis thereof.
Figure 46 (Sheet 3) is an elevation of the spool illustrated at Fig. 45 but viewed transversely to the axis thereof.
Figure 48 (Sheet 3) is a wiring diagram of the various circuits in the machine.

The spool S' at Fig. 49 differs from the spool S at Figs. 45 and 46 in that the former carries disc-like flanges 116 and other suitable appendages 117, and this latter spool is representative of other conventional types which differ from the spool S which was used in the foregoing description of the machine.

To adapt the machine for use with a spool S' it is necessary to provide a tube 233, Fig. 50, having a mandrel 234' which is adapted to carry the spool S'. Such a mandrel 234' will comprise a shaft 341 having a diameter adapted to fit in central orifices of the flanges 116 of the spool S'. This mandrel is suitably hollow to carry a resilient offset spring 342 to lock the spools in position, said spring being suitably held in position by a set screw 343. It is to be noted that this mandrel may be formed differently for various types of spools and generally in the shape of the pivot shafts of the various typewriters which the spools are adapted for. It is to be further noted that with a spool having flanges 116 that the guiding disc 239 of the mandrel 234 is unnecessary.

The only other modification is in the spool feeding apparatus. The modified apparatus F', Figs. 51 and 52, is formed of a plunger 245' within a tubular carrier 246'. The plunger 245' has an enlarged head 344 at the push end with an orifice 345 centrally therein to receive a mandrel end. This plunger is operated by mechanisms similar to the hereinbefore described apparatus, and the only other difference lies in the enlarged chamber 346 of the carrier 246', which is adapted to receive a flanged spool, and in the spool feeding aparatus. In the spool feeding apparatus it is desirable to have the clip 259' positioned on a flatter slope and the spool releasing pin 262' mounted upon a bell crank 266' which is actuated by one end 266a' extending inside the carrier 246' to contact the plunger 245' to release a spool only upon a full return of the plunger.

To operate the ribbon inking and winding machine, a supply of spools S is fed into the clip 259 of the spool feeding apparatus and one spool is inserted upon a mandrel 234 of the shifting head 200. Next, a ribbon from a reel 63 is threaded into the machine, the reel being held tightly between the two plate wheels 66. The course of the ribbon is around the idler roller 76, over the second idler roller 79, thence through the inking rollers 92, thence around the idler roller 110 and back through the second pair of rollers 92'. From the inking apparatus the ribbon is threaded over idle roller 111, thence around idle roller 122 and 123, past the upper roller 122', 125 and the lower roller 122' and finally onto the spool S on mandrel 234. The machine is then ready to start.

The reel is reversed at the plate wheels until the ribbon is taut and idle roller 76 is lifted to close the power supply circuit 87, and the mandrel 234 is rotated until the ribbon is taut at the spool and the tension arm 124 is pulled downward to close switch 131 of circuit 87', and since switch 281 is normally closed, the machine may be started by closing switch 282 of the circuits.

Through the interconnected mechanisms the ribbon moves through the machine at a continuous rate, and is first inked by spray from nozzle 108 as the ribbon passes through the rollers 92 and 92'. Rotation of the mandrel 234 winds the ribbon on the spool S, and as the winding progresses, rotation of the shifting head 200 moves the mandrel from the position shown at Fig. 39 to that at Fig. 40, whereupon the blades 178 and 178' of the cutting apparatus open and move into the path of the ribbon. At the same time the second mandrel of the shifting head is aligned with the spool feeding apparatus and a movement of plunger 245 pushes a spool S thereon for subsequent winding operations. As the ribbon cutting apparatus moves into position to sever the ribbon from the wound spool, the needle 148 tilts and lifts until the point rests against the ribbon. At the instant of cutting, the thrust roller 125 moves outward to cause a reversal of movement of the severed end of the ribbon, and this reversal of movement pulls the ribbon against and threads it upon the spearhead point 168 of the needle 148. Thence, the needle lowers to contact the spool S which has been pushed onto the second mandrel 234 and the hook 118 of the spool S in its rotation moves underneath the arched portion to catch and remove the ribbon from the needle and cause it to be wound upon the spool. The needle then retracts from the field of action and winding proceeds as hereinbefore described. The final step is the rotation of the shifting head to a point where the wound spool S is in discharging position and the bar 269 slidingly pushes the guiding disc 239 of the mandrel 234 outwardly to discharge the wound spool S into the trough 280.

Now I have herein described and illustrated many constructions and combinations of elements of a preferred embodiment of my invention. However, alternate and equivalent arrangements and constructions which differ from the present construction but are within the scope and spirit of my invention, will occur to those skilled in the art, and I wish my protection to be limited not by the herein described arrangements and construction, but only by the proper scope of the appended claims.

I claim:

1. Apparatus for successively winding onto a plurality of spools having peripheral ribbon-connecting hooks, in a continuous operation, a strip of ribbon and cutting the same into sections as wound, comprising, in combination, spindle means adapted to sequentially carry and rotate the spools, a needle adapted to engage and puncture the end portion of the strip, means for shifting the needle, when so engaged, against the periphery of a spindle-carried rotating spool and into alignment with the hook, whereby the hook enters the puncture, connects the ribbon with the spool and pulls it off the needle, ribbon cutting means operative to sever the ribbon responsive to accumulation on the spool of a predetermined amount of ribbon, means actuated responsive to the activation of the cutting means and adapted to impart a short reversal of movement to the end portion of the ribbon strip, said needle-shifting means being adapted to hold the needle canted against said uncut end of the ribbon strip, whereby said reversal movement pulls said end portion against and onto the needle to engage and puncture said end portion.

2. In the organization as defined in claim 1, said needle comprising a pointed head and abutment shoulders therebehind adapted to limit the rearward movement of the pierced ribbon end along the needle, the needle being longitudinally centrally arched to permit the passage of the hook therealong and into the ribbon end slit.

3. The organization as defined in claim 1, wherein said spindle means comprise a pair of spindles mounted upon a rotatable head having their axes in spaced parallelism with the axis of rotation of the head, each spindle being adapted for continuous rotation, and the head being adapted for intermittent rotation to thereby place the spindles at various positions for receiving, winding and discharging spools in a continuous sequence incident with the rotation of the head.

4. The organization as defined in claim 3, wherein said spindles carry extended mandrels adapted to hold said spools in a centered rotatable position.

5. The organization as defined in claim 3 wherein said spindles carry extended mandrels adapted to hold said spools in a centered rotatable position, and also carry guide discs slidably mounted at one side of the mandrels adapted to position the spools axially of the spindles and to slidably discharge the spools from the mandrels after they are wound.

6. In the organization as defined in claim 1, means for feeding the ribbon into the machine at a continuous rate and for holding the ribbon under a substantially uniform tension.

7. In the organization as defined in claim 1, said retraction means comprising a plunger adapted to suddenly and momentarily extend the ribbon from its normal path and thereby retract the severed unwound end.

8. Apparatus for successively winding onto a plurality of spools having peripheral ribbon-connecting hooks, in a continuous operation, a strip of ribbon and cutting the same into sections as wound, comprising in combination, spindle means adapted to sequentially carry and rotate the spools, means for engaging and substantially-coincidently puncturing the end portion of the strip, means for shifting said engaging means against the periphery of a rotating spool and into alignment with the hook whereby the hook enters said puncture, connects the ribbon end to the spool and disconnects the ribbon from the engaging means, and ribbon cutting means operative to sever the ribbon responsive to accumulation on the spool of a predetermined amount of ribbon, said engaging and puncturing means being operative, responsive to the activation of the cutting means, to engage and puncture the end portion of the ribbon for connection of said end portion to the next spool in the sequence.

9. The apparatus defined in claim 8 wherein said spindle means comprises a plurality of spindles mounted upon a rotatable head having their axes in spaced parallelism with the axis of rotation of the head, each spindle being adapted for continuous rotation upon its axis, and the head being adapted for intermittent rotation upon its axis, whereby to selectively position the spindles for receiving, winding and discharging spools in a continuous sequence coincident with the rotation of the head, and means for placing spools upon the spindle at one position of head rotation and discharging the spools from the spindle at another position.

10. The apparatus defined in claim 8 wherein said engaging and puncturing means comprises a needle having a sharp-edged, spear-head point and abutments at the base of the point adapted to hold the ribbon against the base.

11. The apparatus defined in claim 10 wherein said needle is longitudinally arched at the base of the point to facilitate the movement of the hook into the puncture.

12. In apparatus adapted to successively wind ribbon onto a plurality of spools, having peripheral ribbon-connecting hooks, from a continuous strip of ribbon and to cut the ribbon upon completion of winding of each spool, a needle having a sharp-edged spear-head point adapted to be held against the moving ribbon as it is wound upon a spool with the needle point canted against the ribbon in the direction of ribbon movement at a position adjacent the point of cutting, whereby the cut end portion of the ribbon strip contacts the needle point, means to impart to the end of the ribbon strip, a short reversal movement coincident with the cutting of the ribbon whereby to thread upon the needle point and thereby puncture the ribbon strip end, and means to shift the needle into the path of the hook on the next spool in the sequence, whereby to permit the hook to enter the puncture and engage the ribbon to the spool and disengage it from the needle.

13. The apparatus defined in claim 12, wherein said ribbon reversing means comprise a plunger adapted to move across, and distort the ribbon from its normal path of movement during the winding operation.

14. The apparatus defined in claim 12, wherein said ribbon reversing means comprise a plunger mounted at one side of the ribbon path, a pair of rollers mounted at the other side of the ribbon and at each side of the plunger, and means adapted to move the plunger between the rollers to shift the ribbon from its normal path.

15. The apparatus defined in claim 14, including a resilient arm held against the ribbon to impart tension thereto during the cutting operation and shifting of the needle.

16. Apparatus for successively winding onto a plurality of spools having peripheral ribbon-connecting hooks, in a continuous operation, a strip of ribbon and cutting the same into sections as wound, comprising in combination, spindle means adapted to sequentially carry and rotate the spools, means for engaging the end portion of the strip, means for shifting said engaging means against the periphery of a rotating spool and for positioning the strip into the path of its hook whereby the hook connects the strip end to the spool and disconnects the strip from the engaging means, strip cutting means operative to sever the strip responsive to accumulation on the spool of a predetermined amount of strip, means actuated responsive to the activation of the cutting means and adapted to impart a short reversal of movement to the end portion of the strip to bring said end portion into engagement with said end-engaging means, said engaging means being operative, responsive to activation of the cutting means, to engage the end portion of the strip and to then engage it with the next spool in the sequence.

References Cited in the file of this patent

UNITED STATES PATENTS

| Number | Name | Date |
|---|---|---|
| 230,638 | King | Aug. 3, 1880 |
| 377,030 | Jensen | Jan. 31, 1881 |
| 404,151 | Anderson | May 28, 1889 |
| 743,335 | Rogers | Nov. 3, 1903 |
| 972,649 | Rose | Oct. 11, 1910 |
| 1,040,188 | Gray | Oct. 1, 1912 |
| 1,154,301 | Fogarty | Sept. 21, 1915 |
| 1,211,058 | Bischoff | Jan. 2, 1917 |
| 2,007,729 | Shallcross | July 9, 1935 |
| 2,094,112 | Willis | Sept. 28, 1937 |
| 2,095,123 | Carkhuff | Oct. 5, 1937 |
| 2,359,904 | Fluckinger | Oct. 10, 1944 |
| 2,361,264 | Christman | Oct. 24, 1944 |
| 2,373,644 | Belch | Apr. 17, 1945 |
| 2,385,692 | Corbin et al. | Sept. 25, 1945 |